US006733611B2

(12) United States Patent
Hayashi et al.

(10) Patent No.: US 6,733,611 B2
(45) Date of Patent: May 11, 2004

(54) IMAGE FORMING METHOD

(75) Inventors: Masafumi Hayashi, Tokyo-To (JP); Nobuho Ikeuchi, Tokyo-To (JP); Yoshinori Kamikubo, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 194 days.

(21) Appl. No.: 09/921,005

(22) Filed: Aug. 3, 2001

(65) Prior Publication Data

US 2002/0039641 A1 Apr. 4, 2002

(30) Foreign Application Priority Data

Aug. 7, 2000 (JP) ........................................ 2000-237990
Apr. 9, 2001 (JP) ........................................ 2001-110411
Apr. 9, 2001 (JP) ........................................ 2001-110412

(51) Int. Cl.[7] .......................... B44C 1/165; B32B 31/20; B32B 7/02; B41M 3/12

(52) U.S. Cl. ....................... 156/230; 156/239; 156/247; 156/289; 427/148; 428/195; 428/213; 428/219; 428/352; 428/914

(58) Field of Search ................................. 156/230, 238, 156/239, 242, 273, 247, 268, 272.2, 540, 543, 556, 580, 583.1; 427/146, 147, 148; 428/46.1, 41.9, 41.8, 42.1, 42.3, 195, 200, 202, 263, 343, 352, 354, 914, 213, 219, 220

(56) References Cited

U.S. PATENT DOCUMENTS 3,813,267 A 5/1974 Honjo et al.
4,522,881 A * 6/1985 Kobayashi et al. ......... 428/336
4,555,436 A * 11/1985 Geurtsen et al. ............ 428/200
4,556,627 A * 12/1985 Sullivan ...................... 430/312
4,977,136 A * 12/1990 Fujiwara et al. ............ 503/227
5,217,773 A * 6/1993 Yoshida ........................ 428/40
5,397,634 A * 3/1995 Cahill et al. ............. 428/304.4
5,441,838 A 8/1995 Pane
6,042,675 A * 3/2000 Kim ........................... 156/230

FOREIGN PATENT DOCUMENTS

EP 0 365 355 A2 10/1989
EP 1 122 088 A1 2/2001
WO WO 97/30852 8/1997
WO WO 97/43128 11/1997

* cited by examiner

*Primary Examiner*—J. A. Lorengo
(74) *Attorney, Agent, or Firm*—Parkhurst & Wendel, L.L.P.

(57) ABSTRACT

Disclosed is an image forming method comprising the steps of: providing a print output by a nonsilver photographic color hard copy recording system; providing a protective layer transfer sheet comprising a thermally transferable protective layer having a single or multi-layer structure separably provided on a substrate sheet; putting the print and the protective layer transfer sheet on top of each other and thermally transferring the protective layer onto an image in the print so as to cover at least the printed portion in the print; and separating the substrate sheet from the protective layer transfer sheet.

19 Claims, 4 Drawing Sheets

IMAGE FORMING METHOD

TECHNICAL FIELD

The present invention relates to an image forming method which can protect an image of a record produced by a nonsilver photographic color hard copy recording system, such as an electrophotographic recording system, an ink jet recording system, or a thermal transfer recording system, particularly by an electrophotographic system or an ink melt transfer system (a hot-melt transfer system), can impart weathering resistance and the like to the image, can enhance surface gloss of the image, and, at the same time, can prepare records having high image sharpness and image quality comparable to silver salt photographs, and also relates to records obtained therefrom.

BACKGROUND ART

By virtue of the advance of digital cameras and color hard copy technology in recent years, prints having full-color images formed thereon by a nonsilver photographic system, such as an electrophotographic recording system, an ink jet recording system, or a thermal transfer recording system, could have become immediately prepared in situ as the need arises, as opposed to a conventional method wherein a person asks a processing laboratory for development and receives prints later from the processing laboratory.

In these color copy prints, however, images blur upon contact with water, chemicals or the like located close thereto. Further, upon rubbing against hard objects, images are disadvantageously separated or smeared. In addition, in these prints formed particularly by an electrophotographic system or a hot-melt transfer system, the recorded portion rises, and concaves and convexes are formed on the surface of the prints. Therefore, the quality of the prints is much lower than that of photographs having a suitable level of glossiness and a suitable level of sharpness.

For example, in the electrophotographic recording system, a toner image is transferred onto an image-receiving object, the toner is melted by a hot roll, and the melted toner is self-cooled to adhere and fix the cooled toner onto the image-receiving object. In this system, concaves and convexes are formed on the surface of the fixed image, and, thus, the smoothness is low and a suitable level of glossiness and a suitable level of sharpness cannot be provided. On the other hand, Japanese Patent Laid-Open No. 29852/1986 proposes a method wherein an acryl-modified alkyd resin solution is coated on an image formed by an electrophotographic process and the coating is then dried to form a glossy fixed image. Japanese Patent Laid-Open No. 278967/1992 proposes a method for forming deep images wherein the surface of the transfer material is covered with a transparent toner. Further, Japanese Patent Laid-Open No. 224779/1983 proposes a recording apparatus wherein a laminate material with a hot-melt adhesive is heated together with a recorded material to apply the laminate material to the recorded material.

Thus, various proposals have hitherto been made. In output prints formed particularly by an electrophotographic recording system or a hot-melt transfer system wherein the surface of prints rises, however, at the present time, in any event, the above-described post treatment cannot always provide desired photograph-like image quality.

DISCLOSURE OF THE INVENTION

In view of the above problems of the prior art, the present invention has been made, and it is an object of the present invention to provide an image forming method which can protect an image of a record, which can be immediately produced by a nonsilver photographic color hard copy recording system, can impart weathering resistance and the like to the image, can enhance surface gloss to the image, and, at the same time, can prepare records having high image sharpness and image quality comparable to silver salt photographs, and to provide a record obtained therefrom.

First Invention

The above object can be attained by an image forming method according to the first invention which comprises the steps of:

- providing a print output by a nonsilver photographic color hard copy recording system;
- providing a protective layer transfer sheet comprising a thermally transferable protective layer having a single or multi-layer structure separably provided on a substrate sheet;
- putting the print and the protective layer transfer sheet on top of each other and thermally transferring the protective layer onto an image in the print so as to cover at least the printed portion in the print; and
- then separating the substrate sheet from the protective layer transfer sheet.

Preferably, the nonsilver photographic color hard copy recording system is any one of an electrophotographic recording system, an ink jet recording system, and a thermal transfer recording system.

The protective layer transfer sheet preferably comprises: a substrate sheet; and, stacked on the substrate sheet in the following order, a thermally transferable release layer having a single or multi-layer structure and a thermally transferable protective layer having a single or multi-layer structure.

The protective layer transfer sheet preferably comprises: a substrate sheet; and, stacked on the substrate sheet in the following order, a thermally transferable release layer having a single or multi-layer structure, a thermally transferable protective layer having a single or multi-layer structure, and a thermally transferable adhesive layer having a single or multi-layer structure.

Further, the substrate sheet in the protective layer transfer sheet is preferably formed of a 2 to 100 $\mu$m-thick plastic film.

The plastic film preferably has a specular glossiness at 45 degrees of not more than 100%.

Here this specular glossiness is a value as measured under conditions specified in JIS Z 8741.

The coverage of the whole layer to be transferred in the protective layer transfer sheet is preferably 3 to 30 g/m$^2$. According to this constitution, the concaves and the convexes on the surface of the image can be flattened to impart a high level of glossiness to the image. Here the coverage is on a dry basis.

The material used in the thermally transferable protective layer is preferably a thermoplastic resin.

The thermoplastic resin preferably has a Tg value of 40 to 100° C. and a storage modulus at 110° C. of not more than $1\times10^5$ Pa.

According to the present invention, there is provided a protective layer transfer sheet for use in providing any one of the above image forming methods.

Further, according to the present invention, there is provided a record comprising a protective layer provided on the image of the print by any one of the above image forming methods.

The record produced by any one of the above image forming methods has a specular glossiness at 45 degrees in the range of 70 to 110%. Here this specular glossiness is a value as measured under conditions specified in JIS Z 8741.

According to the image forming method comprising the steps of: providing a print output using a nonsilver photographic color hard copy recording system; providing a protective layer transfer sheet comprising a thermally transferable protective layer separably provided on a substrate sheet; putting the print and the protective layer transfer sheet on top of each other and thermally transferring the protective layer onto an image in the print; and then separating the substrate sheet from the protective layer transfer sheet, the concaves and the convexes on the surface of the image can be flattened by the transferred protective layer to impart a high level of glossiness to the image. Further, unlike film laminates, it is possible to eliminate the necessity of significantly increasing the thickness of records, and records can be realized which have image quality comparable to that of silver salt photographs.

Second Invention

According to the second invention, there is provided an image forming method comprising the steps of:

providing a protective layer transfer sheet comprising a thermally transferable protective layer having a single or multi-layer structure separably provided on a substrate sheet;

providing a print output by a nonsilver photographic color hard copy recording system;

putting the protective layer transfer sheet onto the print and thermally transferring the protective layer onto an image in the print so as to cover at least the printed portion; and then separating the substrate sheet from the protective layer transfer sheet, the thermally transferable protective layer in the protective layer transfer sheet being composed mainly of a thermoplastic resin.

The thermoplastic resin preferably contains at least one member selected from the group consisting of polyester resins, epoxy resins, and phenoxy resins.

The thermoplastic resin preferably has a glass transition temperature of 40 to 80° C.

The thermoplastic resin preferably has a weight average molecular weight ($M_w$) of not more than 20000 and a number average molecular weight ($M_n$) of not more than 10000.

The thermoplastic resin preferably comprises two or more types of thermoplastic resins different from each other in number average molecular weight.

Further, preferably, one type of the thermoplastic resin constitutes a main component of the thermoplastic resin and has a number average molecular weight of not more than 10000 while the other type has a number average molecular weight of not less than 10000.

Preferably, a release layer is further provided between the thermally transferable protective layer and the substrate film.

The release layer is preferably composed mainly of an acrylic resin having a number average molecular weight of not more than 40000.

The thermally transferable protective layer preferably contains an ultraviolet absorber.

According to the present invention, there is provided a protective layer transfer sheet for use in providing any one of the image forming methods.

Further, according to the present invention, there is provided a record comprising a protective layer provided on an image of a print by any one of the image forming methods.

According to the image forming method comprising the steps of: providing a protective layer transfer sheet comprising a thermally transferable protective layer having a single or multi-layer structure separably provided on a substrate sheet; providing a print output by a nonsilver photographic color hard copy recording system; putting the protective layer transfer sheet onto the print and thermally transferring the protective layer onto an image in the print so as to cover at least the printed portion; and then separating the substrate sheet from the protective layer transfer sheet, the thermally transferable protective layer in the protective layer transfer sheet being composed mainly of a thermoplastic resin, the concaves and convexes on the surface of the image can be flattened by the transferred protective layer to impart a high level of glossiness to the image. Further, unlike film laminates, it is possible to eliminate the necessity of significantly increasing the thickness of records, and records can be realized which have image quality comparable to that of silver salt photographs.

Third Invention

According to the third invention, there is provided an image forming method comprising the steps of: providing a protective layer transfer sheet comprising a thermally transferable protective layer having a single or multi-layer structure separably provided on a substrate sheet; providing a print output by a nonsilver photographic color hard copy recording system; putting the protective layer transfer sheet onto the print and thermally transferring the protective layer onto an image in the print so as to cover at least the printed portion; and then separating the substrate sheet from the protective layer transfer sheet to form an image provided with a protective layer, the specular glossiness of the image provided with the protective layer being 65 to 110% as measured in the angle range of 45 to 75 degrees according to JIS Z 8741.

Further, according to the present invention, there is provided an image forming method comprising the steps of: providing a protective layer transfer sheet comprising a thermally transferable protective layer having a single or multi-layer structure separably provided on a substrate sheet; providing a print output by a nonsilver photographic color hard copy recording system; putting the protective layer transfer sheet onto the print and thermally transferring the protective layer onto an image in the print so as to cover at least the printed portion; and then separating the substrate sheet from the protective layer transfer sheet to form an image provided with a protective layer, the image in the print being a record of magenta gradation, the difference between the maximum value and the minimum value of the specular glossiness in the whole gradation region of the image provided with the protective layer after the transfer of the protective layer being not more than 20% as measured at 45 degrees according to JIS Z 8741.

According to the present invention, there is provided an image forming method comprising the steps of: providing a protective layer transfer sheet comprising a thermally transferable protective layer having a single or multi-layer structure separably provided on a substrate sheet; providing a print output by a nonsilver photographic color hard copy recording system; putting the protective layer transfer sheet onto the print and thermally transferring the protective layer onto an image in the print so as to cover at least the printed portion; and separating the substrate sheet from the protective layer transfer sheet to form an image provided with a protective layer, the image in the print being a record of magenta gradation, the difference between the maximum value and the minimum value of the specular glossiness in the whole gradation region of the image provided with the protective layer after the transfer of the protective layer as measured at 45 degrees according to JIS Z 8741 being not more than 50% of the difference between the maximum value and the minimum value of the specular glossiness in the whole gradation region of the image provided with the protective layer before the transfer of the protective layer as measured at 45 degrees according to JIS Z 8741.

The nonsilver photographic color hard copy recording system is preferably any one of an electrophotographic recording system, an ink jet recording system, and a thermal transfer recording system.

In the protective layer transfer sheet, the thermally transferable protective layer preferably contains an ultraviolet absorber.

According to the present invention, there is provided a protective layer transfer sheet for use in providing any one of the image forming methods.

Further, according to the present invention, there is provided a record comprising a protective layer provided on an image of a print by any one of the image forming methods.

BEST MODE FOR CARRYING OUT THE INVENTION

Image forming methods according to the present invention and records obtained therefrom will be described with reference to the accompanying drawings.

First Invention

Figure 1:
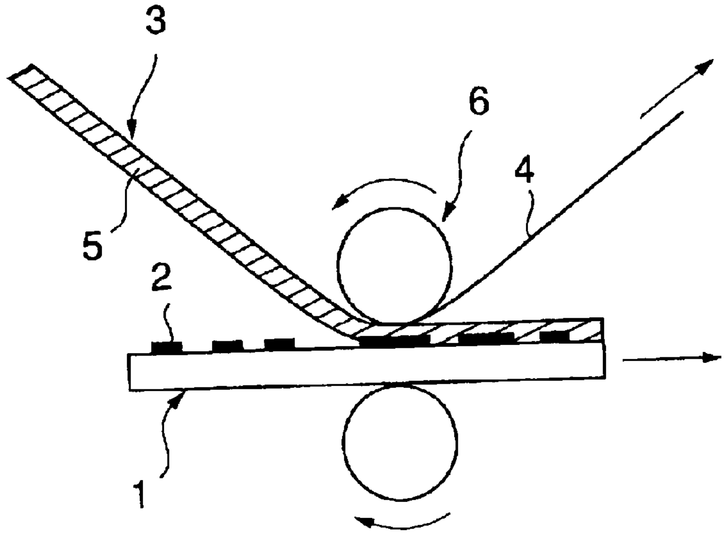
FIG. 1 is a cross-sectional view showing one embodiment of the image forming method according to the present invention.

FIG. 1 is an explanatory view showing one embodiment of the image forming method according to the present invention.

According to this embodiment, a print 1 output by a nonsilver photographic color hard copy recording system is provided. Separately, a protective layer transfer sheet 3 comprising a thermally transferable protective layer 5 separably provided on a substrate sheet 4 is provided. The print 1 and the protective layer transfer sheet 3 are put on top of each other. The protective layer 5 is thermally transferred by heat roll thermal transfer means 6 on an image 2 in the print 1, and the substrate sheet 4 is then separated.

(Print)

The print 1 used in the present invention is one which has been output by a nonsilver photographic color hard copy recording system selected from an electrophotographic recording system, an ink jet recording system, and a thermal transfer recording system. In this case, an image may be formed directly on a substrate. Alternatively, if necessary, a receptive layer suitable for the recording system used may be provided on the substrate so that the recording material can be easily received and fixed.

Substrates for the print usable herein include, for example, synthetic papers (such as polyolefin and polystyrene papers), wood-free papers, art papers, coated papers, cast coated papers, wallpapers, backing papers, papers impregnated with synthetic resin or emulsion, papers impregnated with synthetic rubber latex, papers with synthetic resin being internally added thereto, cellulosic fiber papers, such as paperboards, various plastic films or sheets, such as films or sheets of polyolefin, polystyrene, polycarbonate, polyethylene terephthalate, polyvinyl chloride, and polymethacrylate. Further, additional examples of films or sheets usable herein include, but are not particularly limited to, white opaque films prepared by adding a white pigment or a filler to the synthetic resin and forming a film from the mixture, and films with microvoids in the interior of the substrate. Further, a laminate of any combination of the above substrates may also be used.

The thickness of these substrates may be any one, and, for example, is generally about 10 to 300 $\mu$m.

An electrophotographic recording system is one of recording systems used in the formation of images in the above prints. The principle of this recording system is as follows. When a photoreceptor passes through an electrifier, ions generated by corona discharge are evenly electrified on the surface of the photoreceptor. The surface of the photoreceptor is imagewise exposed in an exposure section. Electrified charges in areas exposed to light are removed by a photo-conducting phenomenon to form a latent image using charges in non-exposed areas. Next, in a development section, a charged toner is electrostatically deposited onto the latent image to form a visible image which is then transferred onto a print in a transfer section. The transferred image is then fixed onto the print by heat and pressure in a fixation section.

In the formation of a full-color image, toners of four colors, i.e., yellow, magenta, cyan, and black toners, are provided, and the above-described process is repeated for each of the toners.

An ink jet recording system may be used as one of the recording systems for the formation of images on prints. According to this system, ink droplets are ejected and deposited directly onto a recording medium to form characters or images. For example, in an on-demand-type ink jet recording system, droplets of ink are formed in response to image signals to perform recording. The on-demand-type ink jet recording system is classified, for example, into an electromechanical conversion type wherein a piezoelectric element is energized to change the volume of an ink chamber to eject the ink through nozzles, and an eletrothermal conversion system wherein a heating element is buried in nozzles and is energized to instantaneously heat and boil ink and consequently to form bubbles in the ink which cause a rapid volume change to eject the ink through the nozzles. In the formation of a full-color image, inks of four colors of yellow, magenta, cyan, and black are provided, and the above-described process is repeated for each ink.

Further, a thermal transfer recording system may be mentioned as one of the recording systems for the formation of images on prints. According to this system, heat energy controlled by image signals is generated by a thermal head and is used as an activating energy for recording materials such as inks. More specifically, an ink ribbon is put on top of recording paper, and the laminate is passed through between a thermal head and platen under a suitable level of pressure. In this case, the recording material is activated by the thermal head heated by energization and is transferred onto the recording paper with the aid of the pressure of the platen. This transfer recording system may be classified into a hot-melt type and a thermal dye sublimation type, and any of these types may be used in the formation of images on prints according to the present invention.

An image may be formed on recording paper by any one of the above-described nonsilver photographic color hard copy recording systems, i.e., electrophotographic recording, ink jet recording, and thermal transfer recording systems. Alternatively, a combination of a plurality of the above recording systems may be used. For example, a method may be used wherein, in a halftone image portion, recording is carried out by the electrophotographic recording system while, in a character portion, recording is carried out by the hot-melt-type thermal transfer recording system.

A method for bringing prints having significant surface irregularities produced particularly by the electrophotographic recording system to photograph-like quality will be mainly described in detail.

In the print used in the present invention, when an image is formed particularly by the electrophotographic system, a method may be used wherein a receptive layer is provided on a substrate and the interface of toner particles and the interface of the receptive layer are rendered soluble in each other to reduce the graininess of the toner. The receptive layer is preferably formed of a resin which can fix toner particles and, particularly in the case of a full-color electrophotographic system, can highly wet color toner particles. Resins usable for the formation of the receptive layer include: polyolefin resins, such as polyethylene and polypropylene; vinyl resins, such as polyvinyl chloride, polyvinylidene chloride, polyvinyl acetate, vinyl chloride-vinyl acetate copolymers, polyacrylic ester, and polystyrene; polyester resins; polyamide resins; copolymers of olefins, such as ethylene and propylene, with other vinyl monomers; ionomers; cellulosic resins, such as ethylcellulose resins and cellulose acetate resins; polycarbonate resins; and phenoxy resins. Particularly preferred are polyester resins having a bisphenol A skeleton.

The above resins may be used alone or as a mixture of two or more. When the receptive layer should be transparent, a resin having good compatibility should be selected and used. The receptive layer may be formed by optionally adding additives to the above resin, dissolving or dispersing the mixture in a suitable solvent to prepare a coating liquid, and coating the coating liquid on a substrate by conventional printing means, such as gravure printing or silk screen printing, or by conventional coating means, such as gravure coating. The thickness of the receptive layer is about 0.5 to 10 $\mu$m on a dry basis.

If necessary, organic and/or inorganic fillers may be mixed with the coating liquid for a receptive layer. Further, in the formation of an image by the electrophotographic system, an antistatic agent should be coated on both sides of a print to realize a good transfer region.

(Protective Layer Transfer Sheet)

Figure 2:
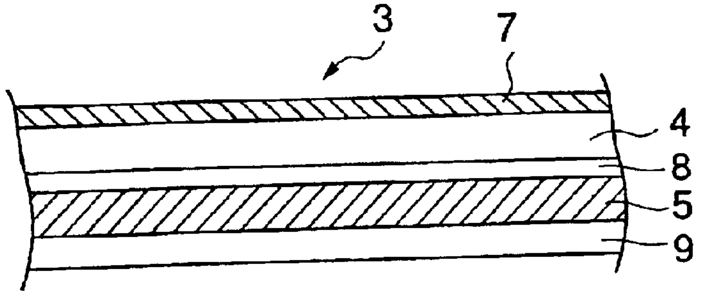
FIG. 2 is a schematic cross-sectional view showing one embodiment of the protective layer transfer sheet used in the present invention.

The protective layer transfer sheet 3 used in the present invention comprises a thermally transferable protective layer 5 separably provided on a substrate sheet 4. If necessary, a heat resistant slip layer 7 may be provided on the backside of the substrate sheet 4, that is, on the substrate sheet 4 in its side remote from the thermally transferable protective layer 5, from the viewpoint of preventing adverse effect, such as sticking or cockling caused by heat, for example, from the thermal head or heat roll as thermal transfer means 6. Further, if necessary, a release layer 8 may be provided between the substrate sheet 4 and the thermally transferable protective layer 5 to facilitate the separation of the thermally transferable protective layer 5 from the substrate sheet 4 at the time of the thermal transfer. Furthermore, an adhesive layer 9 may be provided on the thermally transferable protective layer 5 of the protective layer transfer sheet 3, for example, from the viewpoints of improved transferability and easy adhesion of the thermally transferable protective layer 5 onto the print (see FIG. 2).

It should be noted that the protective layer thermally transferred onto the image of the print should have transparency high enough to permit the underlying thermally transferred image to be viewed through the protective layer without any trouble.

Any conventional resin may be used as the resin for the formation of the heat resistant slip layer 7, and examples thereof include polyvinylbutyral resins, polyvinylacetoacetal resins, polyester resins, vinyl chloride-vinyl acetate copolymers, polyether resins, polybutadiene resins, styrene-butadiene copolymers, acrylic polyols, polyurethane acrylates, polyester acrylates, polyether acrylates, epoxy acrylates, urethane or epoxy prepolymers, nitrocellulose resins, cellulose nitrate resins, cellulose acetopropionate resins, cellulose acetate butyrate resins, cellulose acetate hydrogenphthalate resins, cellulose acetate resins, aromatic polyamide resins, polyimide resins, polycarbonate resins, and chlorinated polyolefin resins.

Slip property-imparting agents added to or coated on the heat resistant slip layer formed of the above resin include phosphoric esters, silicone oils, graphite powders, silicone graft polymers, fluoro graft polymers, acrylic silicone graft polymers, acrylsiloxanes, arylsiloxanes, and other silicone polymers. Preferably, the heat resistant slip layer is formed of a polyol, for example, a polyalcohol polymer compound, a polyisocyanate compound, or a phosphoric ester compound. Further, the addition of a filler is more preferred.

The heat resistant slip layer may be formed by dissolving or dispersing the above resin, slip property-imparting agent, and filler in a suitable solvent to prepare an ink for a heat resistant slip layer, coating the ink on the backside of the substrate sheet, for example, by gravure printing, screen printing, reverse coating using a gravure plate or other coating means, and drying the coating.

Any conventional substrate sheet may be used as the substrate sheet 4 in the protective layer transfer sheet so far as the substrate sheet has a certain level of heat resistance and a certain level of strength. Examples of substrate sheet usable herein include tissue papers, such as glassine paper, capacitor paper, and paraffin paper; plastics, for example, polyesters, such as polyethylene terephthalate and polyethylene naphthalate, polypropylene, cellophane, polycarbonate, cellulose acetate, polyethylene, polyvinyl chloride, polystyrene, nylon, polyimide, polyvinylidene chloride, and ionomers; and composite substrate sheets comprising combinations of the tissue papers and the plastics. The thickness of the substrate sheet may be properly varied depending upon materials for the substrate sheet so that the substrate sheet has proper strength, heat resistance and other properties. However, the thickness is 2 to 100 $\mu$m, preferably about 10 to 80 $\mu$m.

In order to regulate the surface glossiness of the record after the transfer, a matte polyethylene terephthalate film may be used as the substrate sheet. In this case, matting methods usable herein include sandblasting, incorporation, and internal foaming. The specular glossiness of the film, which has been rendered matte, as measured at 45 degrees according to JIS Z 8741 is preferably not more than 100% and not less than about 10%.

In the protective layer transfer sheet according to the present invention, a release layer 8 may be provided between the substrate sheet and the thermally transferable protective layer. The release layer may be formed of a material having excellent release properties, such as waxes, silicone wax, silicone resin, or fluororesin, or a relatively high-softening resin, which does not melt upon exposure to heat of heat rolls or the like, for example, cellulosic resin, acrylic resin, polyurethane resin, polyvinyl acetal resin, or any of the above resins with a heat release agent, such as wax, incorporated therein. Further, the addition of a filler to the release layer permits the peel force to be properly regulated.

The release layer may be formed in the same manner as used in the formation of the heat resistant slip layer, and a thickness of about 0.5 to 5 g/$m^2$ suffices for the release layer.

The thermally transferable protective layer 5 provided on the substrate sheet in the protective layer transfer sheet used in the present invention may be formed of various conventional resins known as resins for a protective layer. Examples of resins for a protective layer usable herein include thermoplastic resins, for example, polyester resins, polystyrene resins, acrylic resins, polyurethane resins, acrylated urethane resins, epoxy resins, phenoxy resins, silicone-modified products of these resins, mixtures of these resins, ionizing radiation-curable resins, and ultraviolet screening resins. In addition, if necessary, ultraviolet absorbers, organic fillers and/or inorganic fillers may be properly added.

A protective layer containing an ionizing radiation-cured resin is particularly excellent in plasticizer resistance and scratch resistance. The ionizing radiation-curable resin for this purpose may be any conventional one. For example, a resin formed by crosslinkinig and curing a radically polymerizable polymer or oligomer through ionizing radiation irradiation and, if necessary, adding a photopolymerization initiator thereto, and then performing polymerization crosslinking by applying an electron beam or ultraviolet light may be used. The ionizing radiation-cured resin may also be added to the release layer and the adhesive layer in the protective layer transfer sheet.

A protective layer containing an ultraviolet screening resin or an ultraviolet absorber mainly functions to impart lightfastness to prints. An example of the ultraviolet screening resin is a resin formed by reacting a reactive ultraviolet absorber with a thermoplastic resin or the above-described ionizing radiation-curable resin to bond the ultraviolet screening resin to the resin. More specifically, the ultraviolet screening resin may be, for example, a resin produced by introducing a reactive group, such as an addition-polymerizable double bond (for example, a vinyl, acryloyl, or methacryloyl group) or an alcoholic hydroxyl, amino, carboxyl, epoxy, or isocyanate group into a conventional organic nonreactive ultraviolet absorber, for example, a salicylate, phenyl acrylate, benzophenone, benzotriazole, cumarin, triazine, or nickel chelate nonreactive organic ultraviolet absorber.

The ultraviolet absorber is a conventional organic nonreactive ultraviolet absorber, and examples thereof include salicylate, phenyl acrylate, benzophenone, benzotriazole, cumarin, triazine, and nickel chelate nonreactive organic ultraviolet absorbers.

The ultraviolet screening resin and the ultraviolet absorber may also be added to the release layer and the adhesive layer in the protective layer transfer sheet.

Specific examples of organic fillers and/or inorganic fillers include, but are not particularly limited to, polyethylene wax, bisamide, nylon, acrylic resin, crosslinked polystyrene, silicone resin, silicone rubber, talc, calcium carbonate, titanium oxide, and finely divided silica such as microsilica and colloidal silica. Preferably, the filler has good slipperiness and has a particle diameter of not more than 10 μm, more preferably in the range of 0.1 to 3 μm. The amount of the filler added is in the range of 0 to 100 parts by mass based on 100 parts by mass of the above resin component and, at the same time, is such that the transferred protective layer can be kept transparent.

Examples of particularly preferred resins for the protective layer include polyester resins having a bisphenol skeleton, epoxy resins, and phenoxy resins. These resins are favorable, for example, from the viewpoints of good transferability to an object and compatibility with toner particles in the formation of an image by an electrophotographic recording system. When the above properties are taken into consideration, specific polyester resins disclosed by the applicant of the present application in Japanese Patent Application No. 36609/1994 are preferred. Specifically, preferred polyester resins are those using, as a diol component, modified bisphenol A, represented by formula 1, prepared by modifying bisphenol A with ethylene glycol or propylene glycol.

Propylene glycol-modified bisphenol A, which is a specific example of the modified bisphenol A, is represented by formula 2.

(1)

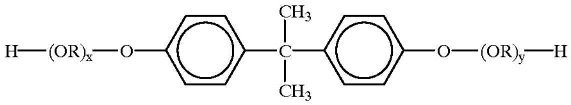

wherein R represents an ethylene or propylene group; and x and y are each an integer of 1 to 5, provided that the average of x and y is 1 to 3.

(2)

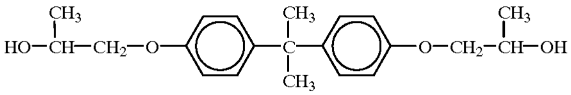

The polyester resin using, as a diol component, ethylene glycol- or propylene glycol-modified bisphenol A has excellent compatibility with toner particles and excellent adhesion to toner images. The acid component of the polyester resin is not particularly limited, and examples thereof include fumaric acid, phthalic acid, terephthalic acid, isophthalic acid, maleic acid, succinic acid, adipic acid, citraconic acid, itaconic acid, sebacic acid, malonic acid, hexacarboxylic acid, and trimellitic acid. Among these polyester resins, resins using, as a diol component, propylene glycol- or ethylene glycol-modified bisphenol A represented by formula 1 and using, as an acid component, fumaric acid, maleic acid, terephthalic acid, or trimellitic acid can offer good compatibility with the binder resin and particularly toner particles, good fixation of toner and wettability of toner and thus can realize images having good quality. When rendering the polyester resin water-dispersible is contemplated, it is common practice to use a method which comprises the steps of dissolving the polyester resin in a ketone solvent, adding a dispersant and water to the solution, and then removing the solvent.

The glass transition temperature (Tg) of the polyester resin is preferably about 40 to 80° C. When the Tg value is in the above defined range, upon heating at the time of thermal transfer, the flexibility of the protective layer can be fully exhibited and the protective layer can conform to the shape of concaves and convexes on the image-formed face and can impart, as an image film, excellent glossiness to the image. When the Tg value is excessively low, for example, upon stacking of records, with the protective layer transferred thereon, on top of one another, the protective layer adheres to the contact face, that is, the so-called "blocking" is disadvantageously likely to take place. On the other hand, when the Tg value is excessively high, the flexibility of the resin upon heating is unsatisfactory and, thus, the adhesion of the resin to the image in the print is disadvantageously lowered.

The polyester resin as the resin for the formation of the thermally transferable protective layer preferably has a mass average molecular weight $M_w$ of not more than 30,000. Bringing the mass average molecular weight of the polyester resin to not more than 30,000 can enhance the flexibility of the resin upon heating and, thus, can realize the formation of a thermally transferable protective layer conforming to the shape of concaves and convexes on the surface of the image in the print. The lower value of the mass average molecular weight is about 5,000. When the mass average molecular weight is excessively low, the resin is so flexible that, upon stacking of records, with the protective layer transferred thereon, on top of one another, the protective layer adheres to the contact face, that is, the so-called "blocking" is likely to take place. When the mass average molecular weight exceeds 30,000, the resin is too hard to be used for the formation of the protective layer. That is, in this case, the adhesion between the resin layer and the image in the print is disadvantageously lowered.

The mass average molecular weight was measured by gel permeation chromatography (GPC). In this case, the column was ULTRA STYRAGELPLUSMX-1000A manufactured by Waters, the solvent was tetrahydrofuran (THF), polystyrene was used for the calibration curve, and the flow rate was 1 ml/min.

The epoxy resin used as the resin for the formation of the thermally transferable protective layer is a polymer containing in its molecule two or more epoxy groups and a resin produced as a result of a ring opening reaction of the epoxy groups. The epoxy resin is generally produced by reacting epichlorohydrin with a compound having active hydrogen and then dehydrochlorinating the reaction product. Among epoxy resins, a bisphenol A epoxy resin having an epoxy equivalent of 450 to 5000 g is preferred, for example, from the viewpoints of excellent heat resistance and abrasion resistance. This bisphenol A epoxy resin may be produced by condensing epichlorohydrin with bisphenol A.

Phenoxy resin is also preferred as the binder resin for the thermally transferable protective layer. The phenoxy resin is generally synthesized from epichlorohydrin and bisphenol, and does not have in its ends a reactive epoxy group. More specifically, the phenoxy resin may be synthesized by reacting high-purity bisphenol A and epichlorohydrin with each other in a molar ratio of 1:1, or by reacting high-purity bisphenol A diglycidyl ether and bisphenol A with each other in a molar ratio of 1:1.

The thermoplastic resin as the resin for the formation of the thermally transferable protective layer preferably has a storage modulus of not more than $1\times10^5$ Pa at 110° C. When the storage modulus of the thermoplastic resin is not more than $1\times10^5$ Pa at 110° C., the protective layer is easily softened at the time of thermal transfer and, thus, a thermally transferable protective layer can be formed which, upon thermal transfer, can smoothly conform to the shape of concaves and convexes on the surface of the image in the print.

The lower limit of the storage modulus at 110° C. is about $1\times10^1$ Pa. When the storage modulus is below the above lower limit, the resin is so soft that, upon stacking of records, with the protective layer transferred thereon, on top of one another, the protective layer adheres to the contact face, that is, the so-called "blocking" is disadvantageously likely to take place. On the other hand, when the storage modulus at 110° C. of the thermoplastic resin exceeds $2\times10^5$ Pa, the resin is so hard that the adhesion of the resin to the image in the print is disadvantageously lowered.

The above storage modulus was measured by means of a viscoelasticity measuring device (ARES) manufactured by Rheometric Scientific at a frequency of 1 $rads^{-1}$.

The thermally transferable protective layer may be formed by dissolving or dispersing the above resin for a protective layer and optionally an ultraviolet absorber, an organic filler and/or an inorganic filler and the like in a suitable solvent to prepare an ink for a thermally transferable protective layer, coating the ink onto the above substrate sheet, for example, by gravure printing, screen printing, or reverse coating using a gravure plate, and drying the coating.

In this case, the coating is carried out so that the coverage of the whole layer to be transferred in the protective layer transfer sheet used in the present invention is about 3 to 30 $g/m^2$, preferably 5 to 20 $g/m^2$.

In the protective layer transfer sheet used in the present invention, an adhesive layer 9 may be provided on the surface of the thermally transferable protective layer from the viewpoints of improving the transferability onto and the adhesion to the print as an object. The adhesive layer may be formed of any conventional pressure-sensitive adhesive or heat-sensitive adhesive. The adhesive layer is preferably formed of a thermoplastic resin having a glass transition temperature (Tg) of 50 to 80° C. For example, the selection of a resin having a suitable glass transition temperature from resins having good heat adhesion, for example, polyester resins, vinyl chloride-vinyl acetate copolymer resins, acrylic resins, ultraviolet absorber resins, butyral resins, epoxy resins, polyamide resins, and vinyl chloride resins, is preferred. In particular, the adhesive layer preferably contains at least one member selected from the group consisting of polyester resins, vinyl chloride-vinyl acetate copolymer resins, acrylic resins, ultraviolet absorber resins, butyral resins, and epoxy resins. The molecular weight of the resin is preferably low from the viewpoint of adhesion or when the adhesive layer is formed as a pattern by heating means, such as a thermal head, on a part of the thermally transferable protective layer rather than the whole area of the thermally transferable protective layer.

The ultraviolet absorber resin may be a resin produced by reactively bonding a reactive ultraviolet absorber to a thermoplastic resin or an ionizing radiation-curable resin. Specifically, the ultraviolet absorber resin may be, for example, a resin produced by introducing a reactive group, such as an addition-polymerizable double bond (for example, a vinyl, acryloyl, or methacryloyl group) or an alcoholic hydroxyl, amino, carboxyl, epoxy, or isocyanate group into a conventional nonreactive organic ultraviolet absorber, for example, a salicylate, phenyl acrylate, benzophenone, benzotriazole, cumarin, triazine, or nickel chelate nonreactive organic ultraviolet absorber.

The adhesive layer is formed by coating a coating liquid containing the resin for constituting the adhesive layer and optionally additives, such as an inorganic or organic filler, and drying the coating to form an adhesive layer preferably having a thickness of about 0.5 to 10 $g/m^2$.

(Means for Thermal Transfer of Protective Layer)

In the image forming method according to the present invention, a protective layer is thermally transferred, from a protective layer transfer sheet comprising a thermally transferable protective layer separably provided on a substrate sheet, onto a print in its image formed by a nonsilver photographic color hard copy recording system. In this case, means usable for the thermal transfer of the protective layer includes: heating by a thermal head in such a state that a print and a protective layer transfer sheet are sandwiched between a thermal head and a platen; a heat roll system as shown in FIG. 1 (which is mainly used in commercially available laminators and uses hot pressing by means of a pair of heat rolls); sandwiching of a print and a protective layer transfer sheet between a heated flat plate and a flat plate; and sandwiching of a print and a protective layer transfer sheet between heated flat plate and a roll followed by hot pressing. Further, thermal transfer means using heating by laser irradiation is also applicable.

In the image forming method according to the present invention, means for forming an image in a print by the nonsilver photographic color hard copy recording system, such as an electrophotographic recording system, an ink jet recording system, or a thermal transfer recording system, and means for the thermal transfer of a protective layer on an image in a print using a protective layer transfer sheet comprising a thermally transferable protective layer separably provided on a substrate sheet are carried out in an in-line or offline manner which may be freely specified. When the above means is carried out in an in-line manner, the image forming means and the protective layer thermal transfer means may be carried out in an identical apparatus, or alternatively, separate apparatuses may be connected to each other and, in this state, may be used for carrying out these means.

For example, the protective layer transfer sheet may be used, in a roll form, together with a winding core. In this case, a continuous system is possible.

Further, the protective layer transfer sheet may be used in a sheet form. A system may also be adopted wherein the protective layer transfer sheet and prints produced by various nonsilver photographic systems are put on top of each other and the laminate is passed through a heat roll. More preferably, a method is used wherein the front end of the protective layer transfer sheet is applied to the front end of a mount and a print is inserted into and sandwiched between the protective layer transfer sheet and the mount. This method is more easy to carry out. In this case, the application of the front ends to each other is carried out, for example, with the aid of a tape or an adhesive. The mount is preferably of a type which has a certain level of nerve. The basis weight is preferably not less than 80 $g/m^2$ and not more than 500 $g/m^2$. The size of the mount and the size of the protective layer transfer sheet should of course be larger than the size of the print. When the stick-out of the protective layer is taken into consideration, satisfying the following relationship is preferred:

Mount$\geqq$Protective layer transfer sheet$\geqq$Print

In the image forming method according to the present invention, preferably, an image in a print is formed by an electrophotographic recording system, and a protective layer is formed in an offline manner on the toner image in the print by using means for the thermal transfer of a protective layer. The reason for this is as follows.

The binder resin used in the toner is a polyester resin using, as a diol, ethylene glycol- or propylene glycol-modified bisphenol A. In this case, the acid component, which is co-polycondensed with the alcohol component, is maleic acid, fumaric acid, citraconic acid, itaconic acid, glutaconic acid, isophthalic acid, terephthalic acid, cyclohexanedicarboxylic acid, succinic acid, adipic acid, sebacic acid, azelaic acid, malonic acid or the like. As described, for example, in Japanese Patent Laid-Open No. 80586/1993, for example, a polyester resin produced by co-polycondensing a linear polyester or a linear polyester having a side chain with a tri- or higher carboxylic acid and/or a tri- or higher alcohol is extensively used. Since this toner binder resin is very highly compatible with a polyester resin as the binder resin in the thermally transferable protective layer, the polyester resin using, as a diol component, ethylene glycol- or propylene glycol-modified bisphenol A, the toner image can be brought into intimate contact with and strongly adhered to the thermally transferable protective layer.

Second Invention

One embodiment of the image forming method according to the second invention will be described with reference to FIG. 1.

According to the image forming method of the second invention, a print 1 output by a nonsilver photographic color hard copy recording system is provided. Separately, a protective layer transfer sheet 3 comprising a thermally transferable protective layer 5 separably provided on a substrate sheet 4 is provided. The print 1 and the protective layer transfer sheet 3 are put on top of each other. The protective layer 5 is thermally transferred by heat roll thermal transfer means 6 on an image 2 in the print 1, and the substrate sheet 4 is then separated.

(Print)

The print 1 used in the present invention is one which has been output by a nonsilver photographic color hard copy recording system selected from an electrophotographic recording system, an ink jet recording system, and a thermal transfer recording system. In this case, an image may be formed directly on a substrate. Alternatively, if necessary, a receptive layer suitable for the recording system used may be provided on the substrate so that the recording material can be easily received and fixed.

Substrates for the print usable herein include, for example, synthetic papers (such as polyolefin and polystyrene papers), wood-free papers, art papers, coated papers, cast coated papers, wallpapers, backing papers, papers impregnated with synthetic resin or emulsion, papers impregnated with synthetic rubber latex, papers with synthetic resin being internally added thereto, cellulosic fiber papers, such as paperboards, various plastic films or sheets, such as films or sheets of polyolefin, polystyrene, polycarbonate, polyethylene terephthalate, polyvinyl chloride, and polymethacrylate. Further, additional examples of films or sheets usable herein include, but are not particularly limited to, white opaque films prepared by adding a white pigment or a filler to the synthetic resin and forming a film from the mixture, and films with microvoids in the interior of the substrate. Further, a laminate of any combination of the above substrates may also be used.

The thickness of these substrates may be any one, and, for example, is generally about 10 to 300 $\mu$m.

An electrophotographic recording system is one of recording systems used in the formation of images in the above prints. The principle of this recording system is as follows. When a photoreceptor passes through an electrifier, ions generated by corona discharge are evenly electrified on the surface of the photoreceptor. The surface of the photoreceptor is imagewise exposed in an exposure section.

Electrified charges in areas exposed to light are removed by a photo-conducting phenomenon to form a latent image using charges in non-exposed areas. Next, in a development section, a charged toner is electrostatically deposited onto the latent image to form a visible image which is then transferred onto a print in a transfer section. The transferred image is then fixed onto the print by heat and pressure in a fixation section.

In the formation of a full-color image, toners of four colors, i.e., yellow, magenta, cyan, and black toners, are provided, and the above-described process is repeated for each of the toners.

An ink jet recording system may be used as one of the recording systems for the formation of images on prints. According to this system, ink droplets are ejected and deposited directly onto a recording medium to form characters or images. For example, in an on-demand-type ink jet recording system, droplets of ink are formed in response to image signals to perform recording. The on-demand-type ink jet recording system is classified, for example, into an electromechanical conversion type wherein a piezoelectric element is energized to change the volume of an ink chamber to eject the ink through nozzles, and an eletrothermal conversion system wherein a heating element is buried in nozzles and is energized to instantaneously heat and boil ink and consequently to form bubbles in the ink which cause a rapid volume change to eject the ink through the nozzles. In the formation of a full-color image, inks of four colors of yellow, magenta, cyan, and black are provided, and the above-described process is repeated for each ink.

Further, a thermal transfer recording system may be mentioned as one of the recording systems for the formation of images on prints. According to this system, heat energy controlled by image signals is generated by a thermal head and is used as an activating energy for recording materials such as inks. More specifically, an ink ribbon is put on top of recording paper, and the laminate is passed through between a thermal head and platen under a suitable level of pressure. In this case, the recording material is activated by the thermal head heated by energization and is transferred onto the recording paper with the aid of the pressure of the platen. This transfer recording system may be classified into a hot-melt type and a thermal dye sublimation type, and any of these types may be used in the formation of images on prints according to the present invention.

An image may be formed on recording paper by any one of the above-described nonsilver photographic color hard copy recording systems, i.e., electrophotographic recording, ink jet recording, and thermal transfer recording systems. Alternatively, a combination of a plurality of the above recording systems may be used. For example, a method may be used wherein, in a halftone image portion, recording is carried out by the electrophotographic recording system while, in a character portion, recording is carried out by the hot-melt-type thermal transfer recording system.

A method for bringing prints having significant surface irregularities produced particularly by the electrophotographic recording system to photograph-like quality will be mainly described in detail.

In the print used in the present invention, when an image is formed particularly by the electrophotographic system, a method may be used wherein a receptive layer is provided on a substrate and the interface of toner particles and the interface of the receptive layer are rendered soluble in each other to reduce the graininess of the toner. The receptive layer is preferably formed of a resin which can fix toner particles and, particularly in the case of a full-color electrophotographic system, can highly wet color toner particles. Resins usable for the formation of the receptive layer include: polyolefin resins, such as polyethylene and polypropylene; vinyl resins, such as polyvinyl chloride, polyvinylidene chloride, polyvinyl acetate, vinyl chloride-vinyl acetate copolymers, polyacrylic ester, and polystyrene; polyester resins; polyamide resins; copolymers of olefins, such as ethylene and propylene, with other vinyl monomers; ionomers; cellulosic resins, such as ethylcellulose resins and cellulose acetate resins; polycarbonate resins; and phenoxy resins. Particularly preferred are polyester resins having a bisphenol A skeleton.

The above resins may be used alone or as a mixture of two or more. When the receptive layer should be transparent, a resin having good compatibility should be selected and used. The receptive layer may be formed by optionally adding additives to the above resin, dissolving or dispersing the mixture in a suitable solvent to prepare a coating liquid, and coating the coating liquid on a substrate by conventional printing means, such as gravure printing or silk screen printing, or by conventional coating means, such as gravure coating. The thickness of the receptive layer is about 0.5 to 10 $\mu$m on a dry basis.

If necessary, organic and/or inorganic fillers may be mixed with the coating liquid for a receptive layer. Further, in the formation of an image by the electrophotographic system, an antistatic agent should be coated on both sides of a print to realize a good transfer region.

(Protective Layer Transfer Sheet)

The protective layer transfer sheet 3 used in the present invention comprises a thermally transferable protective layer 5 separably provided on a substrate sheet 4. If necessary, a heat resistant slip layer 7 may be provided on the backside of the substrate sheet 4, that is, on the substrate sheet 4 in its side remote from the thermally transferable protective layer 5, from the viewpoint of preventing adverse effect, such as sticking or cockling caused by heat, for example, from the thermal head or heat roll as thermal transfer means 6. Further, if necessary, a release layer 8 may be provided between the substrate sheet 4 and the thermally transferable protective layer 5 to facilitate the separation of the thermally transferable protective layer 5 from the substrate sheet 4 at the time of the thermal transfer. Furthermore, an adhesive layer 9 may be provided on the thermally transferable protective layer 5 of the protective layer transfer sheet 3, for example, from the viewpoints of improved transferability and easy adhesion of the thermally transferable protective layer 5 onto the print (see FIG. 2).

It should be noted that the protective layer thermally transferred onto the image of the print should have transparency high enough to permit the underlying thermally transferred image to be viewed through the protective layer without any trouble.

Any conventional resin may be used as the resin for the formation of the heat resistant slip layer 7, and examples thereof include polyvinylbutyral resins, polyvinylacetoacetal resins, polyester resins, vinyl chloride-vinyl acetate copolymers, polyether resins, polybutadiene resins, styrene-butadiene copolymers, acrylic polyols, polyurethane acrylates, polyester acrylates, polyether acrylates, epoxy acrylates, urethane or epoxy prepolymers, nitrocellulose resins, cellulose nitrate resins, cellulose acetopropionate resins, cellulose acetate butyrate resins, cellulose acetate hydrogenphthalate resins, cellulose acetate resins, aromatic polyamide resins, polyimide resins, polycarbonate resins, and chlorinated polyolefin resins.

Slip property-imparting agents added to or coated on the heat resistant slip layer formed of the above resin include phosphoric esters, silicone oils, graphite powders, silicone graft polymers, fluoro graft polymers, acrylic silicone graft polymers, acrylsiloxanes, arylsiloxanes, and other silicone polymers. Preferably, the heat resistant slip layer is formed of a polyol, for example, a polyalcohol polymer compound, a polyisocyanate compound, or a phosphoric ester compound. Further, the addition of a filler is more preferred.

The heat resistant slip layer may be formed by dissolving or dispersing the above resin, slip property-imparting agent, and filler in a suitable solvent to prepare an ink for a heat resistant slip layer, coating the ink on the backside of the substrate sheet, for example, by gravure printing, screen printing, reverse coating using a gravure plate or other coating means, and drying the coating.

Any conventional substrate sheet may be used as the substrate sheet 4 in the protective layer transfer sheet so far as the substrate sheet has a certain level of heat resistance and a certain level of strength. Examples of substrate sheet usable herein include tissue papers, such as glassine paper, capacitor paper, and paraffin paper; plastics, for example, polyesters, such as polyethylene terephthalate and polyethylene naphthalate, polypropylene, cellophane, polycarbonate, cellulose acetate, polyethylene, polyvinyl chloride, polystyrene, nylon, polyimide, polyvinylidene chloride, and ionomers; and composite substrate sheets comprising combinations of the tissue papers and the plastics. The thickness of the substrate sheet may be properly varied depending upon materials for the substrate sheet so that the substrate sheet has proper strength, heat resistance and other properties. However, the thickness is 2 to 100 $\mu$m, preferably about 10 to 80 $\mu$m. The surface of the substrate sheet may be subjected to corona treatment or the like.

In order to regulate the surface glossiness of the record after the transfer, a matte polyethylene terephthalate film may be used as the substrate sheet. In this case, matting methods usable herein include sandblasting, incorporation, and internal foaming.

In the protective layer transfer sheet according to the present invention, when the protective layer is less likely to separate from the substrate sheet at the time of thermal transfer, a release layer 8 may be formed between the substrate sheet and the protective layer. In other words, a release layer may be provided on the substrate sheet to render the substrate sheet releasable. The release layer may be formed, for example, by coating a coating liquid, containing at least one member selected from the group consisting of waxes, silicone waxes, silicone resins, fluororesins, acrylic resins, polyvinyl alcohol resins, cellulose derivative resins, urethane resins, vinyl acetate resins, acryl vinyl ether resins, maleic anhydride resins, and copolymers of monomers constituting these resins, by a conventional method, such as gravure coating or gravure reverse coating, and then drying the coating.

Among the above resins, an acrylic resin is preferably used as a main component of the release layer, because the acrylic resin has excellent adhesion to the substrate sheet and excellent separability from the protective layer.

The acrylic resin may be a polymer comprising at least one monomer selected from conventional acrylate monomers and methacrylate monomers. In this case, styrene, acrylonitrile or the like may be copolymerized with the acrylic monomer.

The acrylic resin preferably has a number average molecular weight of not more than 40,000. When the number average molecular weight exceeds 40,000, the transferability of the protective layer is deteriorated at the time of the transfer of the protective layer. The upper limit of the number average molecular weight of the acrylic resin is 40,000, and the lower limit of the number average molecular weight of the acrylic resin is about 10,000. When the number average molecular weight is less than 10,000, an oligomer is also produced in synthesis of the acrylic resin. Therefore, in this case, stable properties cannot be provided.

The release layer may be properly selected, for example, from one which, at the time of thermal transfer, is transferred onto the object, one which, at the time of thermal transfer, is left on the substrate sheet side, or one which, at the time of thermal transfer, causes cohesive failure. For example, from the viewpoints of excellent surface glossiness and stable transfer of the protective layer, the release layer is preferably a non-transferable one such that, at the time of thermal transfer, the release layer is left on the substrate sheet side and, after the thermal transfer, the interface of the release layer and the thermally transferable protective layer becomes the surface of the protective layer.

The release layer may be formed by a conventional coating method, and a thickness of about 0.5 to 5 $g/m^2$ on a dry basis suffices for the release layer. When the formation of a matte protective layer by the transfer is desired, a protective layer having a matte surface may be formed by incorporating various particles into the release layer, or by matting the surface of the release layer on its protective layer side.

When the separability of the substrate sheet from the protective layer is good, there is no need to provide the release layer and, in this case, upon the thermal transfer, the protective layer can be separated directly from the substrate sheet.

The thermally transferable protective layer 5 provided on the substrate sheet in the protective layer transfer sheet used in the present invention may be formed of various thermoplastic resins known as resins for a protective layer. Examples of resins for a protective layer usable herein include thermoplastic resins, for example, polyester resins, polystyrene resins, acrylic resins, polyurethane resins, acrylated urethane resins, epoxy resins, phenoxy resins, silicone-modified products of these resins, mixtures of these resins, and ultraviolet screening resins. In addition, if necessary, ultraviolet absorbers, organic fillers and/or inorganic fillers may be properly added.

A protective layer containing an ultraviolet screening resin or an ultraviolet absorber mainly functions to impart lightfastness to prints. An example of the ultraviolet screening resin is a resin formed by reacting a reactive ultraviolet absorber with a thermoplastic resin to bond the ultraviolet screening resin to the resin. More specifically, the ultraviolet screening resin may be, for example, a resin produced by introducing a reactive group, such as an addition-polymerizable double bond (for example, a vinyl, acryloyl, or methacryloyl group) or an alcoholic hydroxyl, amino, carboxyl, epoxy, or isocyanate group into a conventional organic nonreactive ultraviolet absorber, for example, a salicylate, phenyl acrylate, benzophenone, benzotriazole, cumarin, triazine, or nickel chelate nonreactive organic ultraviolet absorber.

The ultraviolet absorber is a conventional organic nonreactive ultraviolet absorber, and examples thereof include salicylate, phenyl acrylate, benzophenone, benzotriazole, cumarin, triazine, and nickel chelate nonreactive organic ultraviolet absorbers.

The ultraviolet screening resin and the ultraviolet absorber may also be added to the release layer and the adhesive layer in the protective layer transfer sheet.

The amount of the ultraviolet screening resin and the ultraviolet absorber added is 1 to 30% by weight, preferably about 5 to 20% by weight, based on the binder resin.

Specific examples of organic fillers and/or inorganic fillers include, but are not particularly limited to, polyethylene wax, bisamide, nylon, acrylic resin, crosslinked polystyrene, silicone resin, silicone rubber, talc, calcium carbonate, titanium oxide, and finely divided silica such as microsilica and colloidal silica. Preferably, the filler has good slipperiness and has a particle diameter of not more than 10 μm, more preferably in the range of 0.1 to 3 μm. The amount of the filler added is in the range of 0 to 100 parts by weight based on 100 parts by weight of the above resin component and, at the same time, is such that the transferred protective layer can be kept transparent.

Examples of particularly preferred resins for the protective layer include polyester resins having a bisphenol skeleton, epoxy resins, and phenoxy resins. These resins are favorable, for example, from the viewpoints of good transferability to an object and compatibility with toner particles in the formation of an image by an electrophotographic recording system. When the above properties are taken into consideration, specific polyester resins disclosed by the applicant of the present application in Japanese Patent Application No. 36609/1994 are preferred. Specifically, preferred polyester resins are those using, as a diol component, modified bisphenol A, represented by formula 1, prepared by modifying bisphenol A with ethylene glycol or propylene glycol.

Propylene glycol-modified bisphenol A, which is a specific example of the modified bisphenol A, is represented by formula 2.

(1)

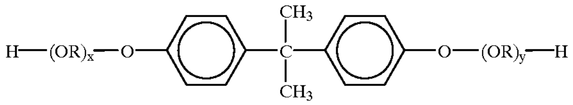

wherein R represents an ethylene or propylene group; and x and y are each an integer of 1 to 5, provided that the average of x and y is 1 to 3.

(2)

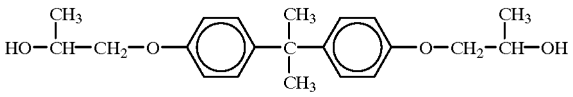

The polyester resin using, as a diol component, ethylene glycol- or propylene glycol-modified bisphenol A has excellent compatibility with toner particles and excellent adhesion to toner images. The acid component of the polyester resin is not particularly limited, and examples thereof include fumaric acid, phthalic acid, terephthalic acid, isophthalic acid, maleic acid, succinic acid, adipic acid, citraconic acid, itaconic acid, sebacic acid, malonic acid, hexacarboxylic acid, and trimellitic acid. Among these polyester resins, resins using, as a diol component, propylene glycol- or ethylene glycol-modified bisphenol A represented by formula 1 and using, as an acid component, fumaric acid, maleic acid, terephthalic acid, or trimellitic acid can offer good compatibility with the binder resin and particularly toner particles, good fixation of toner and wettability of toner and thus can realize images having good quality. When rendering the polyester resin water-dispersible is contemplated, it is common practice to use a method which comprises the steps of dissolving the polyester resin in a ketone solvent, adding a dispersant and water to the solution, and then removing the solvent.

The polyester resin is not limited to a polyester resin using the above bisphenol A as an alcohol component, and the alcohol component may also be selected from glycols, such as polyethylene glycol, isopropylene glycol, and neopentyl glycol.

The epoxy resin used as the resin for the formation of the thermally transferable protective layer is a polymer containing in its molecule two or more epoxy groups and a resin produced as a result of a ring opening reaction of the epoxy groups. The epoxy resin is generally produced by reacting epichlorohydrin with a compound having active hydrogen and then dehydrochlorinating the reaction product. Among epoxy resins, a bisphenol A epoxy resin having an epoxy equivalent of 450 to 5000 g is preferred, for example, from the viewpoints of excellent heat resistance and abrasion resistance. This bisphenol A epoxy resin may be produced by condensing epichlorohydrin with bisphenol A.

Phenoxy resin is also preferred as the binder resin for the thermally transferable protective layer. The phenoxy resin is generally synthesized from epichlorohydrin and bisphenol, and does not have in its ends a reactive epoxy group. More specifically, the phenoxy resin may be synthesized by reacting high-purity bisphenol A and epichlorohydrin with each other in a molar ratio of 1:1, or by reacting high-purity bisphenol A diglycidyl ether and bisphenol A with each other in a molar ratio of 1:1.

The glass transition temperature (Tg) of the thermoplastic resin as the main component of the thermally transferable protective layer is preferably about 40 to 80° C. When the Tg value is in the above defined range, upon heating at the time of thermal transfer, the flexibility of the protective layer can be fully exhibited and the protective layer can conform to the shape of concaves and convexes on the image-formed face and can impart, as an image film, excellent glossiness to the image. When the Tg value is excessively low, for example, upon stacking of records, with the protective layer transferred thereon, on top of one another, the protective layer adheres to the contact face, that is, the so-called "blocking" is disadvantageously likely to take place. On the other hand, when the Tg value is excessively high, the flexibility of the resin upon heating is unsatisfactory and, thus, the adhesion of the resin to the image in the print is disadvantageously lowered.

The thermoplastic resin in the thermally transferable protective layer preferably has a weight average molecular weight $M_w$ of not more than 20,000 and a number average molecular weight $M_n$ of not more than 10,000. Bringing the weight average molecular weight $M_w$ to not more than 20,000 and, at the same time, bringing the number average molecular weight $M_n$ to not more than 10,000 can enhance the flexibility of the resin upon heating and, thus, can realize the formation of a thermally transferable protective layer conforming to the shape of concaves and convexes on the surface of the image in the print. The lower limit of the weight average molecular weight is about 5,000. When the weight average molecular weight is excessively low, the resin is so soft that, upon stacking of records, with the protective layer transferred thereon, on top of one another, the protective layer adheres to the contact face, that is, the so-called "blocking" is likely to take place. When the weight average molecular weight exceeds 20,000 or when the number average molecular weight exceeds 10,000, the resin is too hard to be used for the formation of the protective layer. That is, in this case, the adhesion between the resin layer and the image in the print is disadvantageously lowered.

The weight average molecular weight and the number average molecular weight were measured by gel permeation chromatography (GPC). In this case, the column was ULTRA STYRAGELPLUSMX-1000A manufactured by Waters, the solvent was tetrahydrofuran (THF), polystyrene was used for the calibration curve, and the flow rate was 1 ml/min.

The resin used may be of a single type. When the layer strength and the handleability are taken into consideration, however, the combined use of resins different from each other in number average molecular weight is preferred. In this case, preferably, one type of the resin constitutes the main component of the resin and has a number average molecular weight $M_n$ of not more than 10,000 while the other type has a number average molecular weight $M_n$ of not less than 10,000. Preferably, a proper mixing weight ratio of the main resin to the other resin is selected from between 60:40 to 100:0.

The thermally transferable protective layer may be formed by dissolving or dispersing the above resin for a protective layer and optionally an ultraviolet absorber, an organic filler and/or an inorganic filler and the like in a suitable solvent to prepare an ink for a thermally transferable protective layer, coating the ink onto the above substrate sheet, for example, by gravure printing, screen printing, or reverse coating using a gravure plate, and drying the coating.

In this case, the coating is carried out so that the coverage of the whole layer to be transferred in the protective layer transfer sheet used in the present invention is about 2 to 30 g/m$^2$, preferably 3 to 20 g/m$^2$.

In the protective layer transfer sheet used in the present invention, an adhesive layer 9 may be provided on the surface of the thermally transferable protective layer from the viewpoints of improved transferability onto and improved adhesion to the print as an object. The adhesive layer may be formed of any conventional pressure-sensitive adhesive or heat-sensitive adhesive. The adhesive layer is preferably formed of a thermoplastic resin having a glass transition temperature (Tg) of 40 to 80° C. For example, the selection of a resin having a suitable glass transition temperature from resins having good heat adhesion, for example, polyester resins, vinyl chloride-vinyl acetate copolymer resins, acrylic resins, ultraviolet absorber resins, butyral resins, epoxy resins, polyamide resins, and vinyl chloride resins, is preferred. In particular, the adhesive layer preferably contains at least one member selected from the group consisting of polyester resins, vinyl chloride-vinyl acetate copolymer resins, acrylic resins, ultraviolet absorber resins, butyral resins, and epoxy resins. The molecular weight of the resin is preferably low from the viewpoint of adhesion or when the adhesive layer is formed as a pattern by heating means, such as a thermal head, on a part of the thermally transferable protective layer rather than the whole area of the thermally transferable protective layer.

The ultraviolet absorber resin may be a resin produced by reactively bonding a reactive ultraviolet absorber to a thermoplastic resin or an ionizing radiation-curable resin. Specifically, the ultraviolet absorber resin may be, for example, a resin produced by introducing a reactive group, such as an addition-polymerizable double bond (for example, a vinyl, acryloyl, or methacryloyl group) or an alcoholic hydroxyl, amino, carboxyl, epoxy, or isocyanate group into a conventional nonreactive organic ultraviolet absorber, for example, a salicylate, phenyl acrylate, benzophenone, benzotriazole, cumarin, triazine, or nickel chelate nonreactive organic ultraviolet absorber.

The adhesive layer is formed by coating a coating liquid containing the resin for constituting the adhesive layer and optionally additives, such as an inorganic or organic filler, and drying the coating to form an adhesive layer preferably having a thickness of about 0.5 to 10 g/m$^2$.

(Means for Thermal Transfer of Protective Layer)

In the image forming method according to the present invention, a protective layer is thermally transferred, from a protective layer transfer sheet comprising a thermally transferable protective layer separably provided on a substrate sheet, onto a print in its image formed by a nonsilver photographic color hard copy recording system. In this case, means usable for the thermal transfer of the protective layer includes: heating by a thermal head in such a state that a print and a protective layer transfer sheet are sandwiched between a thermal head and a platen; a heat roll system as shown in FIG. 1 (which is mainly used in commercially available laminators and uses hot pressing by means of a pair of heat rolls); sandwiching of a print and a protective layer transfer sheet between a heated flat plate and a flat plate; and sandwiching of a print and a protective layer transfer sheet between heated flat plate and a roll followed by hot pressing. Further, thermal transfer means using heating by laser irradiation is also applicable.

In the image forming method according to the present invention, means for forming an image in a print by the nonsilver photographic color hard copy recording system, such as an electrophotographic recording system, an ink jet recording system, or a thermal transfer recording system, and means for the thermal transfer of a protective layer on an image in a print using a protective layer transfer sheet comprising a thermally transferable protective layer separably provided on a substrate sheet are carried out in an in-line or offline manner which may be freely specified. When the above means is carried out in an in-line manner, the image forming means and the protective layer thermal transfer means may be carried out in an identical apparatus, or alternatively, separate apparatuses may be connected to each other and, in this state, may be used for carrying out these means.

In the image forming method according to the present invention, preferably, an image in a print is formed by an electrophotographic recording system, and a protective layer is formed in an offline manner on the toner image in the print by using means for the thermal transfer of a protective layer. The reason for this is as follows.

The binder resin used in the toner is a polyester resin using, as a diol, ethylene glycol- or propylene glycol-modified bisphenol A. In this case, the acid component, which is co-polycondensed with the alcohol component, is maleic acid, fumaric acid, citraconic acid, itaconic acid, glutaconic acid, isophthalic acid, terephthalic acid, cyclohexanedicarboxylic acid, succinic acid, adipic acid, sebacic acid, azelaic acid, malonic acid or the like. As described, for example, in Japanese Patent Laid-Open No. 80586/1993, for example, a polyester resin produced by co-polycondensing a linear polyester or a linear polyester having a side chain with a tri- or higher carboxylic acid and/or a tri- or higher alcohol is extensively used. Since this toner binder resin is very highly compatible with the binder resin in the thermally transferable protective layer, that is, a polyester resin using, as a diol component, ethylene glycol- or propylene glycol-modified bisphenol A, or epoxy resin, the toner image can be brought into intimate contact with and strongly adhered to the thermally transferable protective layer.

Outputs of the ink jet recording system, when allowed to stand in the air, undergo a change in hue under the influence of ozone, oxygen or the like. The present invention can overcome this problem. Specifically, the protective layer thermally transferred onto images in the prints according to the present invention can function as a gas barrier and thus can prevent a change in hue of images.

Third Invention

One embodiment of the image forming method according to the third invention will be described with reference to FIG. 1.

According to the image forming method of the third invention, a print 1 output by a nonsilver photographic color hard copy recording system is provided. Separately, a protective layer transfer sheet 3 comprising a thermally transferable protective layer 5 separably provided on a substrate sheet 4 is provided. The print 1 and the protective layer transfer sheet 3 are put on top of each other. The protective layer 5 is thermally transferred by heat roll thermal transfer means 6 on an image 2 in the print 1, and the substrate sheet 4 is then separated.

(Print)

The print 1 used in the present invention is one which has been output by a nonsilver photographic color hard copy recording system selected from an electrophotographic recording system, an ink jet recording system, and a thermal transfer recording system. In this case, an image may be formed directly on a substrate. Alternatively, if necessary, a receptive layer suitable for the recording system used may be provided on the substrate so that the recording material can be easily received and fixed.

Substrates for the print usable herein include, for example, synthetic papers (such as polyolefin and polystyrene papers), wood-free papers, art papers, coated papers, cast coated papers, wallpapers, backing papers, papers impregnated with synthetic resin or emulsion, papers impregnated with synthetic rubber latex, papers with synthetic resin being internally added thereto, cellulosic fiber papers, such as paperboards, various plastic films or sheets, such as films or sheets of polyolefin, polystyrene, polycarbonate, polyethylene terephthalate, polyvinyl chloride, and polymethacrylate. Further, additional examples of films or sheets usable herein include, but are not particularly limited to, white opaque films prepared by adding a white pigment or a filler to the synthetic resin and forming a film from the mixture, and films with microvoids in the interior of the substrate. Further, a laminate of any combination of the above substrates may also be used.

The thickness of these substrates may be any one, for example, is generally about 10 to 300 $\mu$m.

An electrophotographic recording system is one of recording systems used in the formation of images in the above prints. The principle of this recording system is as follows. When a photoreceptor passes through an electrifier, ions generated by corona discharge are evenly electrified on the surface of the photoreceptor. The surface of the photoreceptor is imagewise exposed in an exposure section. Electrified charges in areas exposed to light are removed by a photo-conducting phenomenon to form a latent image using charges in non-exposed areas. Next, in a development section, a charged toner is electrostatically deposited onto the latent image to form a visible image which is then transferred onto a print in a transfer section. The transferred image is then fixed onto the print by heat and pressure in a fixation section.

In the formation of a full-color image, toners of four colors, i.e., yellow, magenta, cyan, and black toners, are provided, and the above-described process is repeated for each of the toners.

An ink jet recording system may be used as one of the recording systems for the formation of images on prints. According to this system, ink droplets are ejected and deposited directly onto a recording medium to form characters or images. For example, in an on-demand-type ink jet recording system, droplets of ink are formed in response to image signals to perform recording. The on-demand-type ink jet recording system is classified, for example, into an electromechanical conversion type wherein a piezoelectric element is energized to change the volume of an ink chamber to eject the ink through nozzles, and an eletrothermal conversion system wherein a heating element is buried in nozzles and is energized to instantaneously heat and boil ink and consequently to form bubbles in the ink which cause a rapid volume change to eject the ink through the nozzles. In the formation of a full-color image, inks of four colors of yellow, magenta, cyan, and black are provided, and the above-described process is repeated for each ink.

Further, a thermal transfer recording system may be mentioned as one of the recording systems for the formation of images on prints. According to this system, heat energy controlled by image signals is generated by a thermal head and is used as an activating energy for recording materials such as inks. More specifically, an ink ribbon is put on top of recording paper, and the laminate is passed through between a thermal head and platen under a suitable level of pressure. In this case, the recording material is activated by the thermal head heated by energization and is transferred onto the recording paper with the aid of the pressure of the platen. This transfer recording system may be classified into a hot-melt type and a thermal dye sublimation type, and any of these types may be used in the formation of images on prints according to the present invention.

An image may be formed on recording paper by any one of the above-described nonsilver photographic color hard copy recording systems, i.e., electrophotographic recording, ink jet recording, and thermal transfer recording systems. Alternatively, a combination of a plurality of the above recording systems may be used. For example, a method may be used wherein, in a halftone image portion, recording is carried out by the electrophotographic recording system while, in a character portion, recording is carried out by the hot-melt-type thermal transfer recording system.

A method for bringing prints having significant surface irregularities produced particularly by the electrophotographic recording system to photograph-like quality will be mainly described in detail.

In the print used in the present invention, when an image is formed particularly by the electrophotographic system, a method may be used wherein a receptive layer is provided on a substrate and the interface of toner particles and the interface of the receptive layer are rendered soluble in each other to reduce the graininess of the toner. The receptive layer is preferably formed of a resin which can fix toner particles and, particularly in the case of a full-color electrophotographic system, can highly wet color toner particles. Resins usable for the formation of the receptive layer include: polyolefin resins, such as polyethylene and polypropylene; vinyl resins, such as polyvinyl chloride, polyvinylidene chloride, polyvinyl acetate, vinyl chloride-vinyl acetate copolymers, polyacrylic ester, and polystyrene; polyester resins; polyamide resins; copolymers of olefins, such as ethylene and propylene, with other vinyl monomers; ionomers; cellulosic resins, such as ethylcellulose resins and cellulose acetate resins; polycarbonate resins; and phenoxy resins. Particularly preferred are polyester resins having a bisphenol A skeleton.

The above resins may be used alone or as a mixture of two or more. When the receptive layer should be transparent, a resin having good compatibility should be selected and used. The receptive layer may be formed by optionally adding additives to the above resin, dissolving or dispersing the mixture in a suitable solvent to prepare a coating liquid, and coating the coating liquid on a substrate by conventional printing means, such as gravure printing or silk screen printing, or by conventional coating means, such as gravure coating. The thickness of the receptive layer is about 0.5 to 10 μm on a dry basis.

If necessary, organic and/or inorganic fillers may be mixed with the coating liquid for a receptive layer. Further, in the formation of an image by the electrophotographic system, an antistatic agent should be coated on both sides of a print to realize a good transfer region.

(Protective Layer Transfer Sheet)

The protective layer transfer sheet 3 used in the present invention comprises a thermally transferable protective layer 5 separably provided on a substrate sheet 4. If necessary, a heat resistant slip layer 7 may be provided on the backside of the substrate sheet 4, that is, on the substrate sheet 4 in its side remote from the thermally transferable protective layer 5, from the viewpoint of preventing adverse effect, such as sticking or cockling caused by heat, for example, from the thermal head or heat roll as thermal transfer means 6. Further, if necessary, a release layer 8 may be provided between the substrate sheet 4 and the thermally transferable protective layer 5 to facilitate the separation of the thermally transferable protective layer 5 from the substrate sheet 4 at the time of the thermal transfer. Furthermore, an adhesive layer 9 may be provided on the thermally transferable protective layer 5 of the protective layer transfer sheet 3, for example, from the viewpoints of improved transferability and easy adhesion of the thermally transferable protective layer 5 onto the print (see FIG. 2).

It should be noted that the protective layer thermally transferred onto the image of the print should have transparency high enough to permit the underlying thermally transferred image to be viewed through the protective layer without any trouble.

Any conventional resin may be used as the resin for the formation of the heat resistant slip layer 7, and examples thereof include polyvinylbutyral resins, polyvinylacetoacetal resins, polyester resins, vinyl chloride-vinyl acetate copolymers, polyether resins, polybutadiene resins, styrene-butadiene copolymers, acrylic polyols, polyurethane acrylates, polyester acrylates, polyether acrylates, epoxy acrylates, urethane or epoxy prepolymers, nitrocellulose resins, cellulose nitrate resins, cellulose acetopropionate resins, cellulose acetate butyrate resins, cellulose acetate hydrogenphthalate resins, cellulose acetate resins, aromatic polyamide resins, polyimide resins, polycarbonate resins, and chlorinated polyolefin resins.

Slip property-imparting agents added to or coated on the heat resistant slip layer formed of the above resin include phosphoric esters, silicone oils, graphite powders, silicone graft polymers, fluoro graft polymers, acrylic silicone graft polymers, acrylsiloxanes, arylsiloxanes, and other silicone polymers. Preferably, the heat resistant slip layer is formed of a polyol, for example, a polyalcohol polymer compound, a polyisocyanate compound, or a phosphoric ester compound. Further, the addition of a filler is more preferred.

The heat resistant slip layer may be formed by dissolving or dispersing the above resin, slip property-imparting agent, and filler in a suitable solvent to prepare an ink for a heat resistant slip layer, coating the ink on the backside of the substrate sheet, for example, by gravure printing, screen printing, reverse coating using a gravure plate or other coating means, and drying the coating.

Any conventional substrate sheet may be used as the substrate sheet 4 in the protective layer transfer sheet so far as the substrate sheet has a certain level of heat resistance and a certain level of strength. Examples of substrate sheet usable herein include tissue papers, such as glassine paper, capacitor paper, and paraffin paper; plastics, for example, polyesters, such as polyethylene terephthalate and polyethylene naphthalate, polypropylene, cellophane, polycarbonate, cellulose acetate, polyethylene, polyvinyl chloride, polystyrene, nylon, polyimide, polyvinylidene chloride, and ionomers; and composite substrate sheets comprising combinations of the tissue papers and the plastics. The thickness of the substrate sheet may be properly varied depending upon materials for the substrate sheet so that the substrate sheet has proper strength, heat resistance and other properties. However, the thickness is 2 to 100 μm, preferably about 10 to 80 μm. The surface of the substrate sheet may be subjected to corona treatment or the like.

In order to regulate the surface glossiness of the record after the transfer, a matte polyethylene terephthalate film may be used as the substrate sheet. In this case, matting methods usable herein include sandblasting, incorporation, and internal foaming. The specular glossiness of the film, which has been rendered matte, as measured in the angle range of 45 to 75 degrees according to JIS Z 8741 is preferably not less than 65% and not more than 110%. When the specular glossiness is less than 65%, the glossiness is too low to provide photograph-like records. On the other hand, when the specular glossiness exceeds 110%, the glossiness is too high to provide photograph-like records.

In the protective layer transfer sheet according to the present invention, a release layer 8 may be provided between the substrate sheet and the thermally transferable protective layer. The release layer may be formed of a material having excellent release properties, such as waxes, silicone wax, silicone resin, or fluororesin, or a relatively high-softening resin, which does not melt upon exposure to heat of heat rolls or the like, for example, cellulosic resin, acrylic resin, polyurethane resin, polyvinyl acetal resin, or any of the above resins with a heat release agent, such as wax, incorporated therein. Further, the addition of a filler to the release layer permits the peel force to be properly regulated.

The release layer may be formed in the same manner as used in the formation of the heat resistant slip layer, and a thickness of about 0.5 to 5 $g/m^2$ suffices for the release layer.

The thermally transferable protective layer 5 provided on the substrate sheet in the protective layer transfer sheet used in the present invention may be formed of various conventional resins known as resins for a protective layer. Examples of resins for a protective layer usable herein include thermoplastic resins, for example, polyester resins, polystyrene resins, acrylic resins, polyurethane resins, acrylated urethane resins, epoxy resins, phenoxy resins, silicone-modified products of these resins, mixtures of these resins, ionizing radiation-curable resins, and ultraviolet screening resins. In addition, if necessary, ultraviolet absorbers, organic fillers and/or inorganic fillers may be properly added.

A protective layer containing an ionizing radiation-cured resin is particularly excellent in plasticizer resistance and scratch resistance. The ionizing radiation-curable resin for this purpose may be any conventional one. For example, a resin formed by crosslinkinig and curing a radically polymerizable polymer or oligomer through ionizing radiation irradiation and, if necessary, adding a photopolymerization initiator thereto, and then performing polymerization crosslinking by applying an electron beam or ultraviolet light may be used. The ionizing radiation-cured resin may also be added to the release layer and the adhesive layer in the protective layer transfer sheet.

A protective layer containing an ultraviolet screening resin or an ultraviolet absorber mainly functions to impart lightfastness to prints. An example of the ultraviolet screening resin is a resin formed by reacting a reactive ultraviolet absorber with a thermoplastic resin or the above-described ionizing radiation-curable resin to bond the ultraviolet screening resin to the resin. More specifically, the ultraviolet screening resin may be, for example, a resin produced by introducing a reactive group, such as an addition-polymerizable double bond (for example, a vinyl, acryloyl, or methacryloyl group) or an alcoholic hydroxyl, amino, carboxyl, epoxy, or isocyanate group into a conventional organic nonreactive ultraviolet absorber, for example, a salicylate, phenyl acrylate, benzophenone, benzotriazole, cumarin, triazine, or nickel chelate nonreactive organic ultraviolet absorber.

The ultraviolet absorber is a conventional organic nonreactive ultraviolet absorber, and examples thereof include salicylate, phenyl acrylate, benzophenone, benzotriazole, cumarin, triazine, and nickel chelate nonreactive organic ultraviolet absorbers.

The ultraviolet screening resin and the ultraviolet absorber may also be added to the release layer and the adhesive layer in the protective layer transfer sheet.

The amount of the ultraviolet screening resin and the ultraviolet absorber added is 1 to 30% by weight, preferably about 5 to 20% by weight, based on the binder resin.

Specific examples of organic fillers and/or inorganic fillers include, but are not particularly limited to, polyethylene wax, bisamide, nylon, acrylic resin, crosslinked polystyrene, silicone resin, silicone rubber, talc, calcium carbonate, titanium oxide, and finely divided silica such as microsilica and colloidal silica. Preferably, the filler has good slipperiness and has a particle diameter of not more than 10 μm, more preferably in the range of 0.1 to 3 μm. The amount of the filler added is in the range of 0 to 100 parts by weight based on 100 parts by weight of the above resin component and, at the same time, is such that the transferred protective layer can be kept transparent.

Examples of particularly preferred resins for the protective layer include polyester resins having a bisphenol skeleton, epoxy resins, and phenoxy resins. These resins are favorable, for example, from the viewpoints of good transferability to an object and compatibility with toner particles in the formation of an image by an electrophotographic recording system. When the above properties are taken into consideration, specific polyester resins disclosed by the applicant of the present application in Japanese Patent Application No. 36609/1994 are preferred. Specifically, preferred polyester resins are those using, as a diol component, modified bisphenol A, represented by formula 1, prepared by modifying bisphenol A with ethylene glycol or propylene glycol.

Propylene glycol-modified bisphenol A, which is a specific example of the modified bisphenol A, is represented by formula 2.

(1)

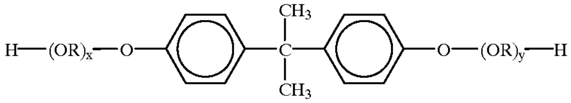

wherein R represents an ethylene or propylene group; and x and y are each an integer of 1 to 5, provided that the average of x and y is 1 to 3.

(2)

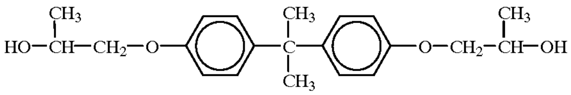

The polyester resin using, as a diol component, ethylene glycol- or propylene glycol-modified bisphenol A has excellent compatibility with toner particles and excellent adhesion to toner images. The acid component of the polyester resin is not particularly limited, and examples thereof include fumaric acid, phthalic acid, terephthalic acid, isophthalic acid, maleic acid, succinic acid, adipic acid, citraconic acid, itaconic acid, sebacic acid, malonic acid, hexacarboxylic acid, and trimellitic acid. Among these polyester resins, resins using, as a diol component, propylene glycol- or ethylene glycol-modified bisphenol A represented by formula 1 and using, as an acid component, fumaric acid, maleic acid, terephthalic acid, or trimellitic acid can offer good compatibility with the binder resin and particularly toner particles, good fixation of toner and wettability of toner and thus can realize images having good quality. The diol component, however, is not particularly limited, and may also be selected, for example, from glycols, such as ethylene glycol, isopropylene glycol, and neopentyl glycol.

When rendering the polyester resin water-dispersible is contemplated, it is common practice to use a method which comprises the steps of dissolving the polyester resin in a ketone solvent, adding a dispersant and water to the solution, and then removing the solvent.

The glass transition temperature (Tg) of the polyester resin is preferably about 40 to 80° C. When the Tg value is in the above defined range, upon heating at the time of thermal transfer, the flexibility of the protective layer can be fully exhibited and the protective layer can conform to the shape of concaves and convexes on the image-formed face and can impart, as an image film, excellent glossiness to the image. When the Tg value is excessively low, for example, upon stacking of records, with the protective layer transferred thereon, on top of one another, the protective layer adheres to the contact face, that is, the so-called "blocking" is disadvantageously likely to take place. On the other hand, when the Tg value is excessively high, the flexibility of the resin upon heating is unsatisfactory and, thus, the adhesion of the resin to the image in the print is disadvantageously lowered.

The polyester resin as the resin for the formation of the thermally transferable protective layer preferably has a weight average molecular weight $M_w$ of not more than 30,000. Bringing the weight average molecular weight of the polyester resin to not more than 30,000 can enhance the flexibility of the resin upon heating and, thus, can realize the formation of a thermally transferable protective layer conforming to the shape of concaves and convexes on the surface of the image in the print. The lower value of the average molecular weight is about 5,000. When the average molecular weight is excessively low, the resin is so soft that, upon stacking of records, with the protective layer transferred thereon, on top of one another, the protective layer adheres to the contact face, that is, the so-called "blocking" is likely to take place. When the average molecular weight exceeds 30,000, the resin is too hard to be used for the formation of the protective layer. That is, in this case, the adhesion between the resin layer and the image in the print is disadvantageously lowered.

The weight average molecular weight was measured by gel permeation chromatography (GPC). In this case, the column was ULTRA STYRAGELPLUSMX-1000A manufactured by Waters, the solvent was tetrahydrofuran (THF), polystyrene was used for the calibration curve, and the flow rate was 1 ml/min.

The epoxy resin used as the resin for the formation of the thermally transferable protective layer is a polymer containing in its molecule two or more epoxy groups and a resin produced as a result of a ring opening reaction of the epoxy groups. The epoxy resin is generally produced by reacting epichlorohydrin with a compound having active hydrogen and then dehydrochlorinating the reaction product. Among epoxy resins, a bisphenol A epoxy resin having an epoxy equivalent of 450 to 5000 g is preferred, for example, from the viewpoints of excellent heat resistance and abrasion resistance. This bisphenol A epoxy resin may be produced by condensing epichlorohydrin with bisphenol A.

Phenoxy resin is also preferred as the binder resin for the thermally transferable protective layer. The phenoxy resin is generally synthesized from epichlorohydrin and bisphenol, and does not have in its ends a reactive epoxy group. More specifically, the phenoxy resin may be synthesized by reacting high-purity bisphenol A and epichlorohydrin with each other in a molar ratio of 1:1, or by reacting high-purity bisphenol A diglycidyl ether and bisphenol A with each other in a molar ratio of 1:1.

The thermoplastic resin as the resin for the formation of the thermally transferable protective layer preferably has a storage modulus of not more than $1\times10^5$ Pa at 110° C. When the storage modulus of the thermoplastic resin is not more than $1\times10^5$ Pa at 110° C., the protective layer is easily softened at the time of thermal transfer and, thus, a thermally transferable protective layer can be formed which, upon thermal transfer, can smoothly conform to the shape of concaves and convexes on the surface of the image in the print.

The lower limit of the storage modulus at 110° C. is about $1\times10^1$ Pa. When the storage modulus is below the above lower limit, the resin is so soft that, upon stacking of records, with the protective layer transferred thereon, on top of one another, the protective layer adheres to the contact face, that is, the so-called "blocking" is disadvantageously likely to take place. On the other hand, when the storage modulus at 110° C. of the thermoplastic resin exceeds $2\times10^5$ Pa, the resin is so hard that the adhesion of the resin to the image in the print is disadvantageously lowered.

The above storage modulus was measured by means of a viscoelasticity measuring device (ARES) manufactured by Rheometric Scientific at a frequency of 1 $rads^{-1}$.

The thermally transferable protective layer may be formed by dissolving or dispersing the above resin for a protective layer and optionally an ultraviolet absorber, an organic filler and/or an inorganic filler and the like in a suitable solvent to prepare an ink for a thermally transferable protective layer, coating the ink onto the above substrate sheet, for example, by gravure printing, screen printing, or reverse coating using a gravure plate, and drying the coating.

In this case, the coating is carried out so that the coverage of the whole layer to be transferred in the protective layer transfer sheet used in the present invention is about 2 to 30 $g/m^2$, preferably 3 to 20 $g/m^2$.

In the protective layer transfer sheet used in the present invention, an adhesive layer 9 may be provided on the surface of the thermally transferable protective layer from the viewpoints of improved transferability onto and improved adhesion to the print as an object. The adhesive layer may be formed of any conventional pressure-sensitive adhesive or heat-sensitive adhesive. The adhesive layer is preferably formed of a thermoplastic resin having a glass transition temperature (Tg) of 40 to 80° C. For example, the selection of a resin having a suitable glass transition temperature from resins having good heat adhesion, for example, polyester resins, vinyl chloride-vinyl acetate copolymer resins, acrylic resins, ultraviolet absorber resins, butyral resins, epoxy resins, polyamide resins, and vinyl chloride resins, is preferred. In particular, the adhesive layer preferably contains at least one member selected from the group consisting of polyester resins, vinyl chloride-vinyl acetate copolymer resins, acrylic resins, ultraviolet absorber resins, butyral resins, and epoxy resins. The molecular weight of the resin is preferably low from the viewpoint of adhesion or when the adhesive layer is formed as a pattern by heating means, such as a thermal head, on a part of the thermally transferable protective layer rather than the whole area of the thermally transferable protective layer.

The ultraviolet absorber resin may be a resin produced by reactively bonding a reactive ultraviolet absorber to a thermoplastic resin or an ionizing radiation-curable resin. Specifically, the ultraviolet absorber resin may be, for example, a resin produced by introducing a reactive group, such as an addition-polymerizable double bond (for example, a vinyl, acryloyl, or methacryloyl group) or an alcoholic hydroxyl, amino, carboxyl, epoxy, or isocyanate group into a conventional nonreactive organic ultraviolet absorber, for example, a salicylate, phenyl acrylate, benzophenone, benzotriazole, cumarin, triazine, or nickel chelate nonreactive organic ultraviolet absorber.

The adhesive layer is formed by coating a coating liquid containing the resin for constituting the adhesive layer and optionally additives, such as an inorganic or organic filler, and drying the coating to form an adhesive layer preferably having a thickness of about 0.5 to 10 $g/m^2$.

(Means for Thermal Transfer of Protective Layer)

In the image forming method according to the present invention, a protective layer is thermally transferred, from a protective layer transfer sheet comprising a thermally transferable protective layer separably provided on a substrate sheet, onto a print in its image formed by a nonsilver photographic color hard copy recording system. In this case, means usable for the thermal transfer of the protective layer includes: heating by a thermal head in such a state that a print and a protective layer transfer sheet are sandwiched between a thermal head and a platen; a heat roll system as shown in FIG. 1 (which is mainly used in commercially available laminators and uses hot pressing by means of a pair of heat rolls); sandwiching of a print and a protective layer transfer sheet between a heated flat plate and a flat plate; and sandwiching of a print and a protective layer transfer sheet between heated flat plate and a roll followed by hot pressing. Further, thermal transfer means using heating by laser irradiation is also applicable.

In the image forming method according to the present invention, means for forming an image in a print by the nonsilver photographic color hard copy recording system, such as an electrophotographic recording system, an ink jet recording system, or a thermal transfer recording system, and means for the thermal transfer of a protective layer on an image in a print using a protective layer transfer sheet comprising a thermally transferable protective layer separably provided on a substrate sheet are carried out in an in-line or offline manner which may be freely specified. When the above means is carried out in an in-line manner, the image forming means and the protective layer thermal transfer means may be carried out in an identical apparatus, or alternatively, separate apparatuses may be connected to each other and, in this state, may be used for carrying out these means.

In the image forming method according to the present invention, preferably, an image in a print is formed by an electrophotographic recording system, and a protective layer is formed in an offline manner on the toner image in the print by using means for the thermal transfer of a protective layer. The reason for this is as follows.

The binder resin used in the toner is a polyester resin using, as a diol, ethylene glycol- or propylene glycol-modified bisphenol A. In this case, the acid component, which is co-polycondensed with the alcohol component, is maleic acid, fumaric acid, citraconic acid, itaconic acid, glutaconic acid, isophthalic acid, terephthalic acid, cyclohexanedicarboxylic acid, succinic acid, adipic acid, sebacic acid, azelaic acid, malonic acid or the like. As described, for example, in Japanese Patent Laid-Open No. 80586/1993, for example, a polyester resin produced by co-polycondensing a linear polyester or a linear polyester having a side chain with a tri- or higher carboxylic acid and/or a tri- or higher alcohol is extensively used. Since this toner binder resin is very highly compatible with a polyester resin as the binder resin in the thermally transferable protective layer, the polyester resin using, as a diol component, ethylene glycol- or propylene glycol-modified bisphenol A, the toner image can be brought into intimate contact with and strongly adhered to the thermally transferable protective layer.

Outputs of the ink jet recording system, when allowed to stand in the air, undergo a change in hue under the influence of ozone, oxygen or the like. The present invention can overcome this problem. Specifically, the protective layer thermally transferred onto images in the prints according to the present invention can function as a gas barrier and thus can prevent a change in hue of images.

EXAMPLES

The present invention will be described in more detail with reference to the following examples. In the following examples, "parts" or "%" is by mass unless otherwise specified.

Example A1

A 12 $\mu$m-thick polyethylene terephthalate film (Lumirror, manufactured by Toray Industries, Inc.) was provided as a substrate sheet. A coating liquid for a thermally transferable protective layer having the following composition was gravure coated on one side of the substrate sheet to form a thermally transferable protective layer at a coverage of 20.0 g/m$^2$ on a dry basis. Thus, a protective layer transfer sheet of Example A1 was prepared.

<Coating Liquid for Thermally Transferable Protective Layer>

| | |
|---|---|
| Polyester resin (copolymer of fumaric acid with PO-modified bisphenol A, Tg: 58° C., Mw: 15000, storage modulus G' at 110° C.: 1.5 × 10$^2$ Pa) | 40 parts |
| Silica particles (average particle diameter 15 $\mu$m) | 0.2 part |
| Methyl ethyl ketone | 30 parts |
| Toluene | 30 parts |

Example A2

A 25 $\mu$m-thick polyethylene terephthalate film (Lumirror, manufactured by Toray Industries, Inc.) was provided as a substrate sheet. A coating liquid for a release layer having the following composition was gravure coated on one side of the substrate sheet to form a release layer at a coverage of 3.0 g/m$^2$ on a dry basis. A coating liquid for a thermally transferable protective layer having the following composition was gravure coated on the release layer to form a thermally transferable protective layer at a coverage of 10.0 g/m$^2$ on a dry basis. Thus, a protective layer transfer sheet of Example A2 was prepared.

<Coating Liquid for Release Layer>

| | |
|---|---|
| Acrylic resin (BR-87, manufactured by Mitsubishi Rayon Co., Ltd.) | 30 parts |
| Methyl ethyl ketone | 35 parts |
| Toluene | 35 parts |

<Coating Liquid for Thermally Transferable Protective Layer>

| | |
|---|---|
| Epoxy resin (1007, manufactured by Yuka Shell Epoxy K. K.) (Tg: 82° C., storage modulus G' at 110° C.: 1.0 × 10$^4$ Pa) | 30 parts |
| Methyl ethyl ketone | 35 parts |
| Toluene | 35 parts |

Example A3

A 50 $\mu$m-thick polyethylene terephthalate film (Lumirror, manufactured by Toray Industries, Inc.) was provided as a substrate sheet. The same coating liquid for a release layer as used in Example 2 was gravure coated on one side of the substrate sheet to form a release layer at a coverage of 3.0 g/m$^2$ on a dry basis. On the other hand, a coating liquid for a heat resistant slip layer having the following composition was previously gravure coated on the backside of the substrate sheet to form a heat resistant slip layer at a coverage of 2.0 g/m$^2$ on a dry basis. In this case, the heat resistant slip layer after coating was heat aged to cure the coating.

<Coating Liquid for Heat Resistant Slip Layer>

| | |
|---|---|
| Polyvinyl butyral resin (S-lec BX-1, manufactured by Sekisui Chemical Co., Ltd.) | 3.6 parts |

-continued

| | |
|---|---|
| Polyisocyanate (Burnock D 750-45, manufactured by Dainippon Ink and Chemicals, Inc.) | 19.2 parts |
| Phosphoric ester surfactant (Plysurf A 208 S, manufactured by Dai-Ichi Kogyo Seiyaku Co., Ltd.) | 2.9 parts |
| Phosphoric ester surfactant (Phosphanol RD 720, manufactured by Toho Chemical Industry Co., Ltd.) | 0.3 parts |
| Talc (manufactured by Nippon Talc Co., Ltd.) | 0.2 part |
| Methyl ethyl ketone | 33 parts |
| Toluene | 33 parts |

Next, the same coating liquid for a thermally transferable protective layer as used in Example A2 was gravure coated on the release layer to form a thermally transferable protective layer at a coverage of 10.0 $g/m^2$ on a dry basis. Further, a coating liquid for an adhesive layer having the following composition was gravure coated on the thermally transferable protective layer to form an adhesive layer at a coverage of 5.0 $g/m^2$ on a dry basis. Thus, a protective layer transfer sheet of Example A3 was prepared.

<Coating Liquid for Adhesive Layer>

| | |
|---|---|
| Polyester resin (Vylon 220, manufactured by Toyobo Co., Ltd.) | 30 parts |
| Methyl ethyl ketone | 35 parts |
| Toluene | 35 parts |

Example A4

A protective layer transfer sheet of Example A4 was prepared in the same manner as in Example A2, except that the coating liquid for a thermally transferable protective layer in Example A2 was changed to a coating liquid having the following composition.

<Coating Liquid for Thermally Transferable Protective Layer>

| | |
|---|---|
| Epoxy resin (1007, manufactured by Yuka Shell Epoxy K. K.) (Tg: 82° C., storage modulus G' at 110° C.: $1.0 \times 10^4$ Pa) | 15 parts |
| Cerium oxide (cerium ultraviolet absorber) (NEEDRAL W-100, manufactured by Taki Chemical Co., Ltd.) | 15 parts |
| Methyl ethyl ketone | 35 parts |
| Toluene | 35 parts |

Example A5

The procedure of Example A2 was repeated, except that the substrate sheet was changed to a 25 $\mu$m-thick Matte PET (a polyethylene terephthalate film having a matted surface, Lumirror X44 manufactured by Toray Industries, Inc., specular glossiness 45%). Thus, a protective layer transfer sheet of Example A5 was prepared.

Example A6

The procedure of Example A2 was repeated, except that the substrate sheet was changed to a 19 $\mu$m-thick Matte PET (a polyethylene terephthalate film having a matted surface, Lumirror X42 manufactured by Toray Industries, Inc., specular glossiness 19%). Thus, a protective layer transfer sheet of Example A6 was prepared.

Example A7

The procedure of Example A2 was repeated, except that the substrate sheet was changed to a 26 M-thick Matte PET (a polyethylene terephthalate film having a matted surface, Lumirror manufactured by Toray Industries, Inc., specular glossiness 80%). Thus, a protective layer transfer sheet of Example A7 was prepared.

Next, prints for evaluation were provided under the following conditions.

(a) An image of a test pattern was formed on a cast coated paper by an electrophotographic system by means of Color PPC (PIXEL) manufactured by Canon Inc. This output is designated as print a.

(b) An image of a test pattern was formed on a cast coated paper by a hot-melt transfer system by means of Microdry (MD-5500, manufactured by Alps Electric Co., Ltd.). This output is designated as print b.

(c) An image of a test pattern was formed on a specialty paper by a dye sublimation transfer system by means of Microdry (MD-5500, manufactured by Alps Electric Co., Ltd.). This output is designated as print c.

(d) An image of a test pattern was formed on a specialty paper by an ink jet system by means of an ink jet printer (MC-2000, manufactured by Seiko Epson Corporation). This output is designated as print d.

A thermally transferable protective layer was transferred using each of the protective layer transfer sheets of the examples of the present invention prepared above onto the image of the prints. The transfer was carried out by means of a heat roll-type laminator under conditions of roll temperature 120° C., roll pressure 1.5 kg/cm, and lamination speed 1 cm/sec.

(Evaluation Effect)

The protective layer was thermally transferred using the protective layer transfer sheet of Example A1 onto the prints a, b, c, and d. As a result, for all the prints, the surface was flattened, and a high level of glossiness could be imparted. Further, the image sharpness was high, and, in particular, for the prints a and c, the image quality was comparable to that of silver salt photographs. Furthermore, the records thus obtained had excellent fastness properties, such as excellent fastness to weathering, because the surface of the images was covered with the thermal transfer protective layer.

The protective layer was thermally transferred using the protective layer transfer sheet of Example A2 onto the prints a and b. As a result, for all the prints, the surface was flattened, and a high level of glossiness could be imparted. Further, the image sharpness was high, and, in particular, for the print a, the image quality was comparable to that of silver salt photographs. Furthermore, the records thus obtained had excellent fastness properties, such as excellent fastness to weathering, because the surface of the images was covered with the thermal transfer protective layer.

The protective layer was thermally transferred using the protective layer transfer sheet of Example A3 onto the prints c and d. As a result, for all the prints, the surface was flattened, and a high level of glossiness could be imparted. Further, the image sharpness was high, and, in particular, for the print c, the image quality was comparable to that of silver salt photographs. Furthermore, the records thus obtained had excellent fastness properties, such as excellent fastness to weathering, because the surface of the images was covered with the thermal transfer protective layer.

The protective layer was thermally transferred using the protective layer transfer sheet of Example A4 onto the print c. As a result, the surface of the print was flattened, and a high level of glossiness could be imparted. Further, the image sharpness was high, and the image quality was comparable to that of silver salt photographs. Furthermore, the record thus obtained had excellent fastness properties, such as excellent fastness to weathering, because the surface of the image was covered with the thermal transfer protective layer.

The protective layer was thermally transferred using the protective layer transfer sheets of Examples A5 and A6 onto the prints a and b. As a result, for all the prints, the surface was in a matte state, the image sharpness was high, and, in particular, for the print a, the image quality was comparable to that of silver salt photographs (matte type). Further, the records thus obtained had excellent fastness properties, such as excellent fastness to weathering, because the surface of the image was covered with the thermal transfer protective layer.

The protective layer was thermally transferred using the protective layer transfer sheet of Example A7 onto the prints a and b. As a result, the prints were relatively glossy, had a somewhat matte surface, and had high image sharpness, and, in particular, for the print a, the image quality was comparable to that of silver salt photographs. Further, the records thus obtained had excellent fastness properties, such as excellent fastness to weathering, because the surface of the image was covered with the thermal transfer protective layer.

A protective layer was thermally transferred using the protective layer transfer sheet of each of the above examples of the present invention onto prints, and, for the records, the specular glossiness was measured at 45 degrees according to JIS Z 8741. The results of the measurement are shown in Table A1 below.

TABLE A1

| | Glossiness of surface of record | Print |
|---|---|---|
| Ex. A1 | 99% | d |
| Ex. A2 | 103% | a |
| Ex. A3 | 102% | b |
| Ex. A4 | 100% | c |
| Ex. A5 | 51% | a |
| Ex. A6 | 30% | a |
| Ex. A7 | 85% | a |

Example A8

The protective layer transfer sheet of Example A2 was cut into a size of 230 mm×320 mm. A white cardboard paper (270 g/$m^2$) was provided as a material for a mount, and was cut into a size of 240 mm×330 mm to prepare a mount. The protective layer transfer sheet was then put on top of the mount, and the upper end of the protective layer transfer sheet was fixed onto the upper end of the mount by applying a mending tape. A print of size A4 was sandwiched between the protective layer transfer sheet and the mount, followed by the transfer of the protective layer.

Comparative Example A1

A 50 $\mu$m-thick polyethylene terephthalate film (Lumirror, manufactured by Toray Industries, Inc.) was provided as a substrate sheet. A coating liquid for a laminate adhesive layer having the following composition was gravure coated on one side of the substrate sheet to form a laminate adhesive layer at a coverage of 2.0 g/$m^2$ on a dry basis. Thus, a laminate sheet was prepared.

<Coating Liquid for Laminate Adhesive Layer>

| | |
|---|---|
| Vinyl chloride-vinyl acetate copolymer (#1000 ALK, manufactured by Denki Kagaku Kogyo K. K.) | 30 parts |
| Toluene | 35 parts |
| Methyl ethyl ketone | 35 parts |

The laminate sheet provided in the above comparative example was applied, offline from image formation means, onto the whole area of the prints including images produced in the same manner as described above by means of a heat roll-type laminator. The records provided with a laminate sheet thus obtained had acceptable surface glossiness and image sharpness. The records, however, were partly cockled. Further, the thickness of the records was significantly large, the hand feeling and the like were deteriorated, and the handleability was poor.

As is apparent from the foregoing description, according to the image forming method of the present invention comprising the steps of: providing a print output by a nonsilver photographic color hard copy recording system; providing a protective layer transfer sheet comprising a thermally transferable protective layer separably provided on a substrate sheet; putting the print and the protective layer transfer sheet on top of each other and thermally transferring the protective layer onto an image in the print; and then separating the substrate sheet from the protective layer transfer sheet, the concaves and the convexes on the surface of the image can be flattened by the transferred protective layer to impart a high level of glossiness to the image. Further, unlike film laminates, it is possible to eliminate the necessity of significantly increasing the thickness of records, and records can be realized which have image quality comparable to that of silver salt photographs.

Example B1

A 12 $\mu$m-thick polyethylene terephthalate film (Lumirror, manufactured by Toray Industries, Inc.) was provided as a substrate sheet. A coating liquid for a thermally transferable protective layer having the following composition was gravure coated on one side of the substrate sheet to form a thermally transferable protective layer at a coverage of 20.0 g/$m^2$ on a dry basis. Thus, a protective layer transfer sheet of Example B1 was prepared.

<Coating Liquid for Thermally Transferable Protective Layer>

| | |
|---|---|
| Polyester resin (copolymer of fumaric acid with bisphenol A, Tg: 58° C., $M_w$: 10000, $M_n$: 4000, storage modulus G' at 110° C.: 2.0 × $10^4$ Pa) | 50 parts |
| Silica particles (average particle diameter 5 $\mu$m) | 0.1 part |
| Methyl ethyl ketone | 25 parts |
| Toluene | 25 parts |

Example B2

A 25 $\mu$m-thick polyethylene terephthalate film (Lumirror, manufactured by Toray Industries, Inc.) was provided as a substrate sheet. A coating liquid for a release layer having the following composition was gravure coated on one side of the substrate sheet to form a release layer at a coverage of 3.0 g/$m^2$ on a dry basis. A coating liquid for a thermally transferable protective layer having the following composition was gravure coated on the release layer to form a thermally transferable protective layer at a coverage of 10.0 g/$m^2$ on a dry basis. Thus, a protective layer transfer sheet of Example B2 was prepared.

<Coating Liquid for Release Layer>

| | |
|---|---|
| Acrylic resin ($M_n$: 20000) | 18 parts |
| Polyester resin | 2 parts |
| Methyl ethyl ketone | 40 parts |
| Toluene | 40 parts |

<Coating Liquid for Thermally Transferable Protective Layer>

| | |
|---|---|
| Polyester resin (copolymer of terephthalic acid with ethylene glycol, Tg: 62° C., $M_w$: 15000, $M_n$: 6000, storage modulus G' at 110° C.: 7.0 × $10^3$ Pa) | 40 parts |
| PMMA filler (average particle diameter 3 μm) | 0.1 part |
| Methyl ethyl ketone | 30 parts |
| Toluene | 30 parts |

Example B3

A protective layer transfer sheet of Example B3 was prepared in the same manner as in Example B1, except that the coating liquid for a thermally transferable protective layer in Example B1 was changed to a coating liquid having the following composition.

<Coating Liquid for Thermally Transferable Protective Layer>

| | |
|---|---|
| Polyester resin (copolymer of fumaric acid with bisphenol A, Tg: 58° C., $M_w$: 10000, $M_n$: 4000, storage modulus G' at 110° C.: 2.0 × $10^4$ Pa) | 50 parts |
| Benzotriazole | 5 parts |
| Silica particles (average particle diameter 5 μm) | 0.1 part |
| Methyl ethyl ketone | 25 parts |
| Toluene | 25 parts |

Example B4

A protective layer transfer sheet of Example B4 was prepared in the same manner as in Example B3, except that the coating liquid for a thermally transferable protective layer in Example B3 was changed to a coating liquid having the following composition.

<Coating Liquid for Thermally Transferable Protective Layer>

| | |
|---|---|
| Epoxy resin (Tg: 57° C., $M_w$: 6000, $M_n$: 3500, storage modulus G' at 100° C.: 1.0 × $10^3$ Pa) | 45 parts |
| Benzophenone | 5 parts |
| Methyl ethyl ketone | 25 parts |
| Toluene | 25 parts |

Example B5

A protective layer transfer sheet of Example B5 was prepared in the same manner as in Example B1, except that the coating liquid for a thermally transferable protective layer in Example B1 was changed to a coating liquid having the following composition.

<Coating Liquid for Thermally Transferable Protective Layer>

| | |
|---|---|
| Polyester resin (copolymer of fumaric acid with bisphenol A, Tg: 52° C., $M_w$: 15000, $M_n$: 5000) | 35 parts |
| Polyester resin (copolymer of terephthalic acid with ethylene glycol, Tg: 67° C., $M_n$: 20000) | 3 parts |
| Benzotriazole | 2 parts |
| Silica particles (average particle diameter 5 μm) | 0.1 part |
| Methyl ethyl ketone | 30 parts |
| Toluene | 30 parts |

Comparative Example B1

No protective layer transfer sheet was provided, and the following prints were not subjected to any post-treatment including the transfer of the protective layer and other treatment.

Next, prints for evaluation were provided under the following conditions.

(a) An image of a test pattern was formed on a cast coated paper by an electrophotographic system by means of Color PPC (A-COLOR) manufactured by Fuji Xerox Co., Ltd. This output is designated as print a.

(b) An image of a test pattern was formed on a cast coated paper by a hot-melt transfer system by means of Microdry (MD-5500, manufactured by Alps Electric Co., Ltd.). This output is designated as print b.

(c) An image of a test pattern was formed on a specialty paper by a dye sublimation transfer system by means of Microdry (MD-5500, manufactured by Alps Electric Co., Ltd.). This output is designated as print c.

(d) An image of a test pattern was formed on a specialty paper by an ink jet system by means of an ink jet printer (PM-900, manufactured by Seiko Epson Corporation). This output is designated as print d.

A thermally transferable protective layer was transferred using each of the protective layer transfer sheets of the examples of the present invention prepared above onto the image of the prints. The transfer was carried out by means of a heat roll-type laminator under conditions of roll temperature 120° C., roll pressure 1.5 kg/cm, and lamination speed 1 cm/sec.

(Evaluation Method)

SCID N1 was used as an image test pattern formed by each of the above recording systems. A protective layer was thermally transferred using the protective layer transfer sheets provided in each example onto the image of the output produced by each of the recording systems. The appearance of the prints was visually inspected to evaluate the surface glossiness.

In Comparative Example B1 wherein outputs produced by each of the recording systems were not subjected to any of the thermal transfer of the protective layer and other post-treatments, the surface glossiness was evaluated. For the prints of all the examples and comparative examples except for Comparative Example B1, the surface glossiness was overall evaluated based on the surface glossinesses of the prints a, b, c, and d.

Evaluation criteria were as follows.

○: The image surface had high smoothness and very high glossiness, and the image quality was close to that of silver salt photographs.

Δ: The image surface did not have high smoothness, had surface irregularities, and had somewhat poor glossiness.

X: The image surface had low smoothness, noticeable surface irregularities, and poor glossiness, and the image quality was not comparable to that of silver salt photographs.

The results of evaluation of the above outputs (prints) on the surface glossiness were as summarized in the table below.

TABLE B1

| | Surface glossiness |
|---|---|
| Ex. | |
| Ex. B1 | ○ |
| Ex. B2 | ○ |
| Ex. B3 | ○ |
| Ex. B4 | ○ |
| Ex. B5 | ○ |
| Comp. Ex. B1 | |
| Output a | X |
| Output b | X |
| Output c | Δ |
| Output d | X |

As is apparent from the foregoing description, in the image forming method comprising the steps of: providing a protective layer transfer sheet comprising a thermally transferable protective layer having a single or multi-layer structure separably provided on a substrate sheet; providing a print output by a nonsilver photographic color hard copy recording system; putting the protective layer transfer sheet onto the print and thermally transferring the protective layer onto an image in the print so as to cover at least the printed portion; and then separating the substrate sheet from the protective layer transfer sheet, the thermally transferable protective layer in the protective layer transfer sheet being composed mainly of a thermoplastic resin, the concaves and convexes on the surface of the image can be flattened by the transferred protective layer to impart a high level of glossiness to the image. Further, unlike film laminates, it is possible to eliminate the necessity of significantly increasing the thickness of records, and records can be realized which have image quality comparable to that of silver salt photographs.

Example C1

A 12 $\mu$m-thick polyethylene terephthalate film (Lumirror, manufactured by Toray Industries, Inc.) was provided as a substrate sheet. A coating liquid for a thermally transferable protective layer having the following composition was gravure coated on one side of the substrate sheet to form a thermally transferable protective layer at a coverage of 20.0 g/m$^2$ on a dry basis. Thus, a protective layer transfer sheet of Example C1 was prepared.

<Coating Liquid for Thermally Transferable Protective Layer>

| | |
|---|---|
| Polyester resin (copolymer of fumaric acid with bisphenol A, Tg: 58° C., $M_w$: 10000, storage modulus G' at 110° C.: $2.0 \times 10^4$ Pa) | 50 parts |
| Silica particles (average particle diameter 5 $\mu$m) | 0.1 part |
| Methyl ethyl ketone | 25 parts |
| Toluene | 25 parts |

Example C2

A 25 $\mu$m-thick polyethylene terephthalate film (Lumirror, manufactured by Toray Industries, Inc.) was provided as a substrate sheet. A coating liquid for a release layer having the following composition was gravure coated on one side of the substrate sheet to form a release layer at a coverage of 3.0 g/m$^2$ on a dry basis. A coating liquid for a thermally transferable protective layer having the following composition was gravure coated on the release layer to form a thermally transferable protective layer at a coverage of 10.0 g/m$^2$ on a dry basis. Thus, a protective layer transfer sheet of Example C2 was prepared.

<Coating Liquid for Release Layer>

| | |
|---|---|
| Acrylic resin | 18 parts |
| Polyester resin | 2 parts |
| Methyl ethyl ketone | 40 parts |
| Toluene | 40 parts |

<Coating Liquid for Thermally Transferable Protective Layer>

| | |
|---|---|
| Polyester resin (copolymer of terephthalic acid with ethylene glycol, Tg: 62° C., $M_w$: 15000, storage modulus G' at 110° C.: $7.0 \times 10^3$ Pa) | 40 parts |
| PMMA filler (average particle diameter 3 $\mu$m) | 0.1 part |
| Methyl ethyl ketone | 30 parts |
| Toluene | 30 parts |

Example C3

A protective layer transfer sheet of Example C3 was prepared in the same manner as in Example C1, except that the coating liquid for a thermally transferable protective layer in Example C1 was changed to a coating liquid having the following composition.

<Coating Liquid for Thermally Transferable Protective Layer>

| | |
|---|---|
| Polyester resin (copolymer of fumaric acid with bisphenol A, Tg: 58° C., $M_w$: 10000, storage modulus G' at 110° C.: $2.0 \times 10^4$ Pa) | 50 parts |
| Benzotriazole | 5 parts |
| Silica particles (average particle diameter 5 $\mu$m) | 0.1 part |
| Methyl ethyl ketone | 25 parts |
| Toluene | 25 parts |

Comparative Example C1

No protective layer transfer sheet was provided, and the following prints were not subjected to any post-treatment including the transfer of the protective layer and other treatment.

Next, prints for evaluation were provided under the following conditions.

(a) An image of a test pattern was formed on a cast coated paper by an electrophotographic system by means of Color PPC (A-COLOR) manufactured by Fuji Xerox Co., Ltd. This output is designated as print a.

(b) An image of a test pattern was formed on a cast coated paper by a hot-melt transfer system by means of Microdry (MD-5500, manufactured by Alps Electric Co., Ltd.). This output is designated as print b.

(c) An image of a test pattern was formed on a specialty paper by a dye sublimation transfer system by means of Microdry (MD-5500, manufactured by Alps Electric Co., Ltd.). This output is designated as print c.

(d) An image of a test pattern was formed on a specialty paper by an ink jet system by means of an ink jet printer (PM-900, manufactured by Seiko Epson Corporation). This output is designated as print d.

(Image Output Method)

For magenta, 0 to 100% gradations were prepared in 256 gradations. Further, a test pattern of SCID N1 was used for the overall evaluation.

The number of gradations for 0 to 100% gradations in 256 gradations of magenta is shown in Table C1 below.

TABLE C1

| Gradation, % | R | G | B |
|---|---|---|---|
| 0 | 255 | 255 | 255 |
| 10 | 253 | 233 | 242 |
| 20 | 250 | 213 | 229 |
| 30 | 248 | 194 | 217 |
| 40 | 246 | 173 | 205 |
| 50 | 244 | 154 | 194 |
| 60 | 242 | 135 | 183 |
| 70 | 241 | 115 | 172 |
| 80 | 239 | 91 | 161 |
| 90 | 238 | 62 | 150 |
| 100 | 236 | 0 | 140 |

(Conditions for Transfer of Protective Layer)

A thermally transferable protective layer was transferred using each of the protective layer transfer sheets of the examples of the present invention prepared above onto the image of the prints. The transfer was carried out by means of a heat roll-type laminator under conditions of roll temperature 120° C., roll pressure 1.5 kg/cm, and lamination speed 1 cm/sec.

(Results of Evaluation)

Figure 3:
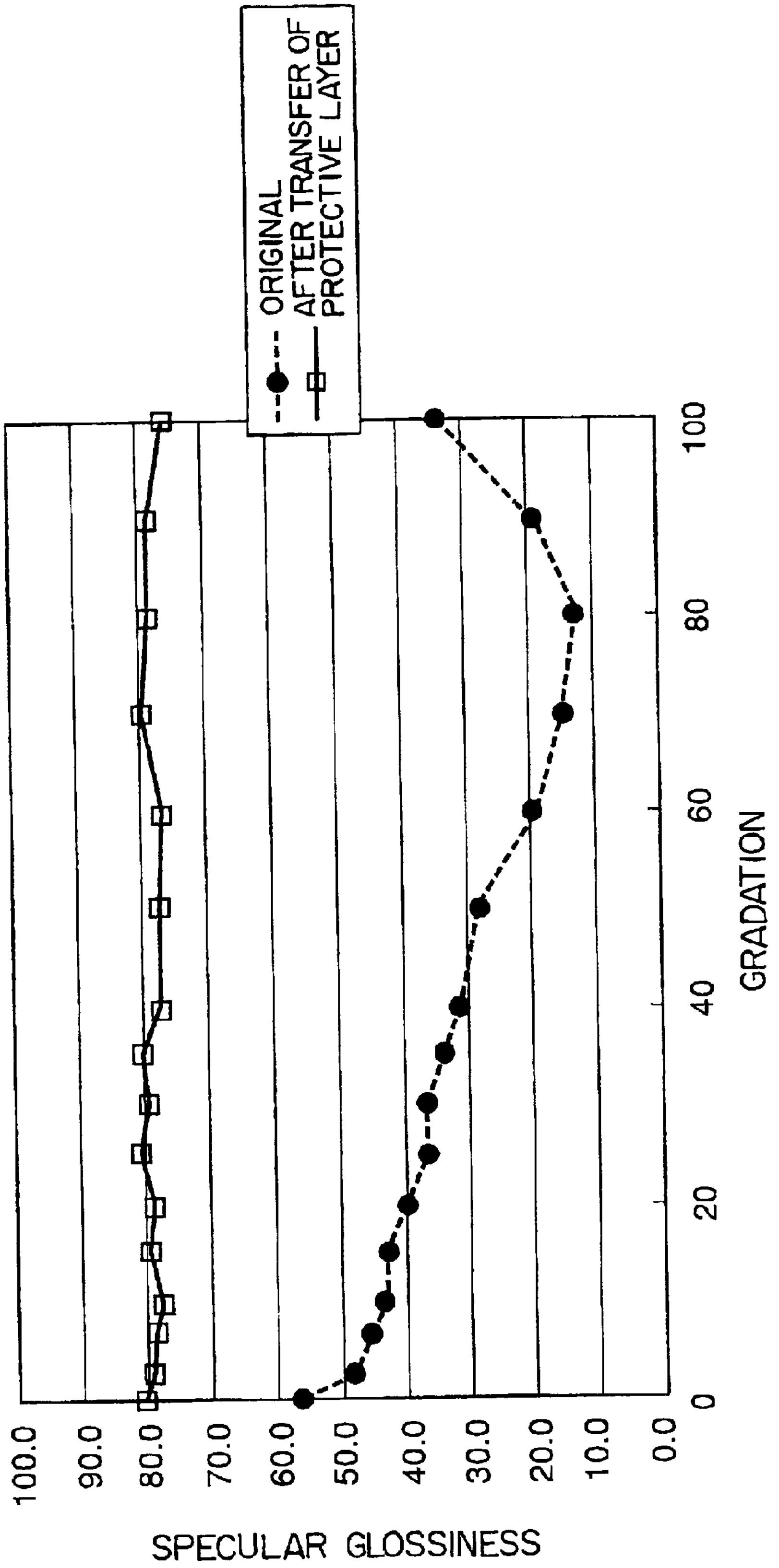
FIG. 3 is a graph showing the specular glossiness at 45 degrees for magenta.
Figure 4:
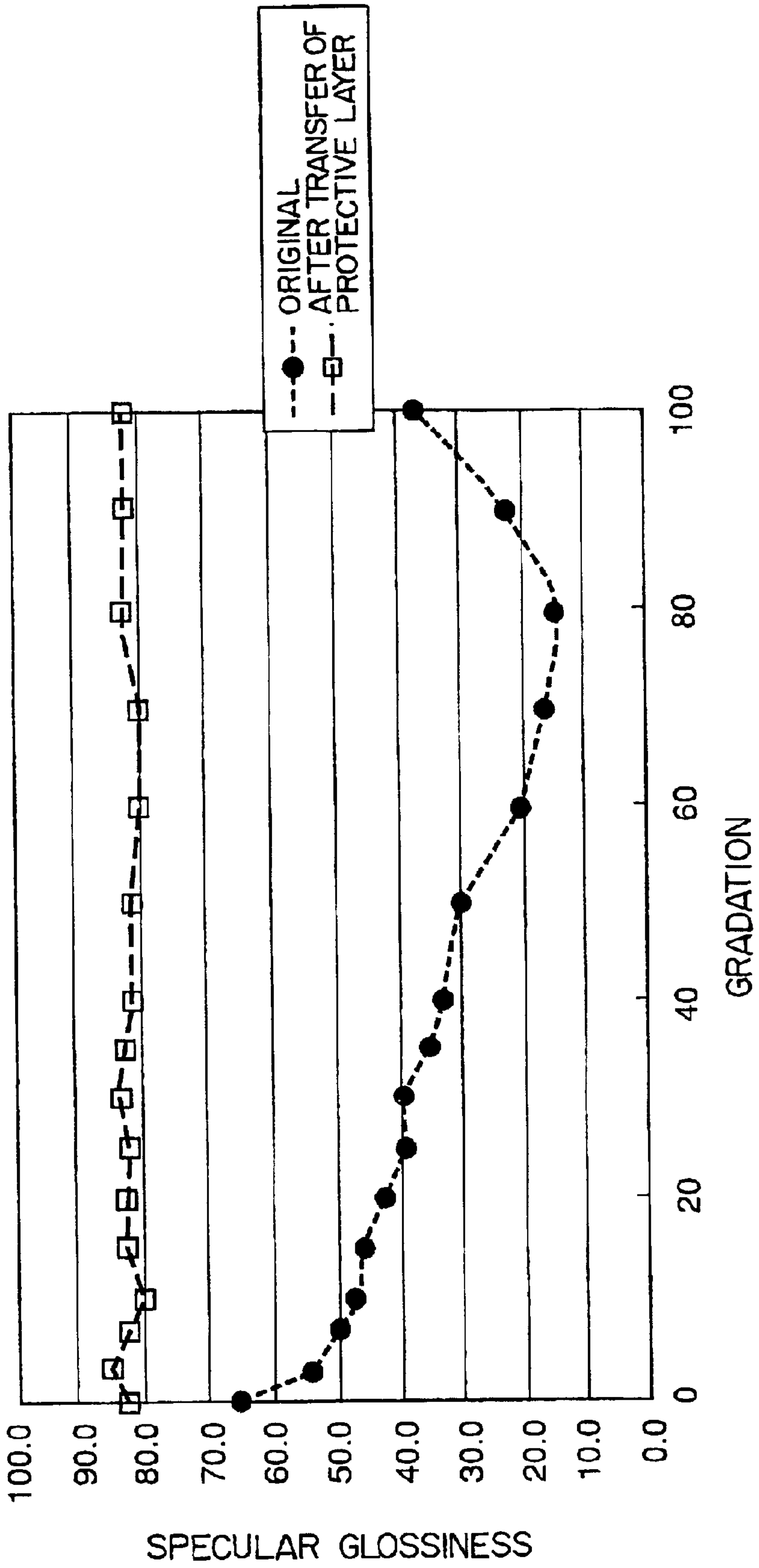
FIG. 4 is a graph showing the specular glossiness at 60 degrees for magenta.
Figure 5:
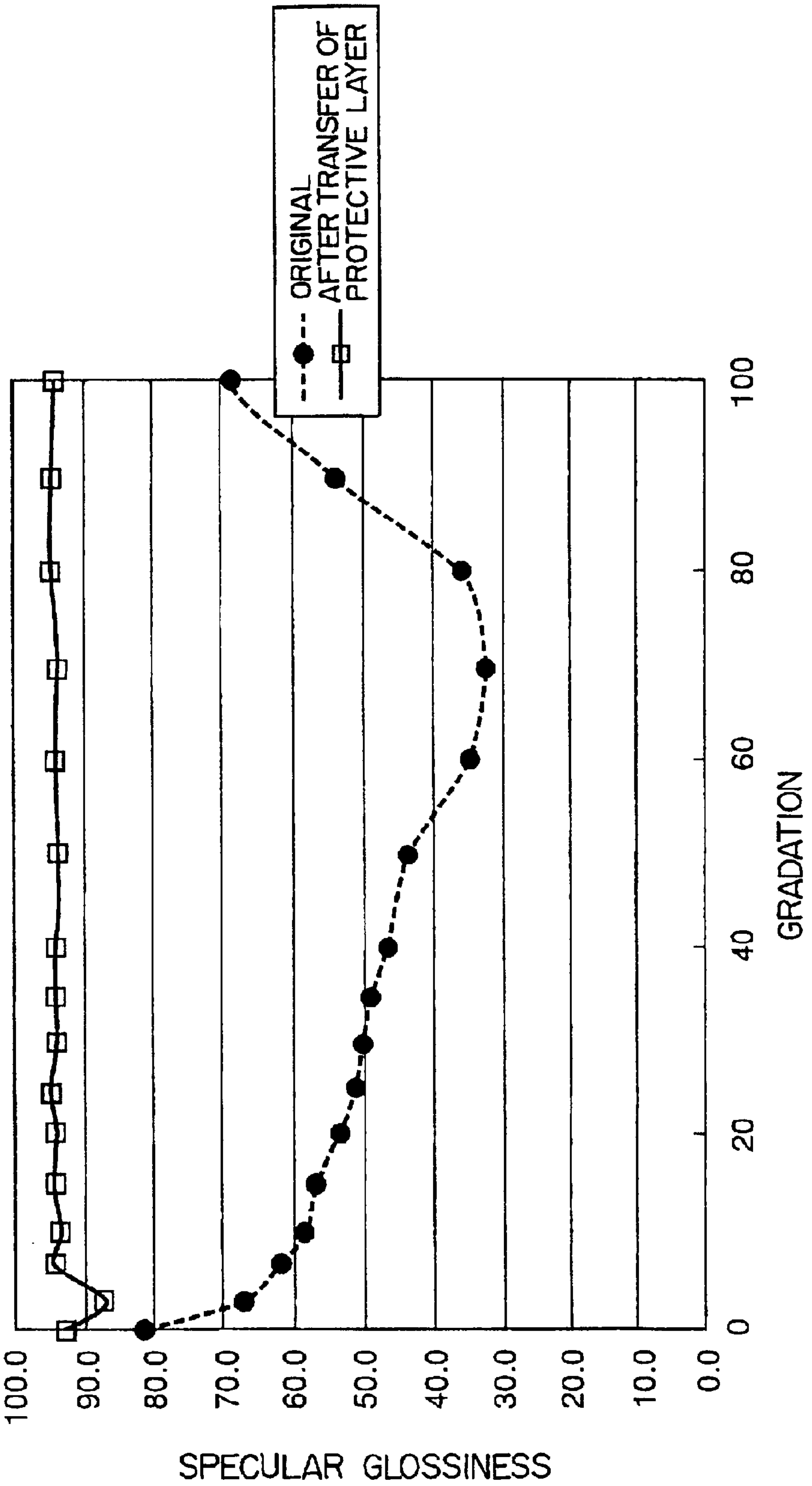
FIG. 5 is a graph showing the specular glossiness at 75 degrees for magenta.

Data on specular glossiness of an original in 0 to 100% gradations of magenta output by A-COLOR manufactured by Fuji Xerox Co., Ltd. and data on specular glossiness after the transfer (after the treatment) of the protective layer are shown as an example in graphs of FIGS. 3 to 5. The specular glossiness was measured according to JIS Z 8741. In this case, the specular glossiness was measured on three levels of the angle of reflection of a light beam, 45 degrees, 60 degrees, and 75 degrees, and the protective layer transfer sheet prepared in Example C3 was used.

Regarding graphs showing data obtained in the measurement in FIGS. 3 to 5, FIG. 3 shows the specular glossiness of magenta at 45 degrees, FIG. 4 the specular glossiness of magenta at 60 degrees, and FIG. 5 the specular glossiness of magenta at 75 degrees. As is apparent from these graphs, the specular glossiness after the treatment (after the transfer of the protective layer) falls within the range of 65 to 110% at angles of reflection of light beam of 45 to 75 degrees. In the sample used in this test, the thickness of the thermally transferable protective layer is relatively thick. When this thickness is reduced, the range of the specular glossiness is further broadened (that is, the variation in data on specular glossiness is increased). According to the present invention, the optimal value of the specular glossiness as measured in the angle range of 45 to 75 degrees according to JIS Z 8741 was 65 to 110%.

The difference between the maximum value and the minimum value of the specular glossiness in the whole gradation region of the magenta image after the transfer of the protective layer was not more than 20% at 45 degrees as measured according to JIS Z 8741.

Further, the difference between the maximum value and the minimum value of the specular glossiness in the whole gradation region of the magenta image after the transfer of the protective layer as measured at 45 degrees according to JIS Z 8741 was not more than 50% of the difference (46%) between the maximum value (58%) and the minimum value (12%) of the specular glossiness in the whole gradation region of the magenta image (original) before the transfer of the protective layer as measured at 45 degrees according to JIS Z 8741.

On the other hand, for the print (original) of Comparative Example C1 on which the protective layer had not been transferred, the minimum value in the whole gradation region of the magenta image as measured at 45 degrees according to JIS Z 8741 was 12%, and the maximum value in the whole gradation region of the magenta image as measured at 45 degrees according to JIS Z 8741 was 58%. That is, the difference between the maximum value and the minimum value of the specular glossiness in the whole gradation region of the magenta image as measured at 45 degrees according to JIS Z 8741 was 46%.

The same results as obtained above were also obtained in prints of images produced by recording systems other than the electrophotographic system.

A thermally transferable protective layer was transferred using the protective layer transfer sheets provided in each of Examples C1 to C3 onto the images of outputs a, b, c, and d produced by each of the recording systems. The appearance of the prints was visually inspected to evaluate the surface glossiness. In Comparative Example C1 wherein outputs produced by each of the recording systems were not subjected to any of the thermal transfer of the protective layer and other post-treatments, the surface glossiness was evaluated. For the outputs of the examples and comparative example, the surface glossinesses of the outputs a, b, c, and d were overall evaluated.

Evaluation criteria were as follows.

○: The image surface had high smoothness and very high glossiness, and the image quality was close to that of silver salt photographs.

Δ: The image surface did not have high smoothness, had surface irregularities, and had somewhat poor glossiness.

X: The image surface had low smoothness, noticeable surface irregularities, and poor glossiness, and the image quality was not comparable to that of silver salt photographs.

The results of evaluation of the above outputs (prints) on the surface glossiness were as summarized in Table C2 below.

TABLE C2

| | Surface glossiness |
|---|---|
| Ex. | |
| Ex. C1 | ○ |
| Ex. C2 | ○ |
| Ex. C3 | ○ |
| Comp. Ex. C1 | |
| Output a | x |
| Output b | x |
| Output c | Δ |
| Output d | Δ |

As is apparent from the forgoing description, in the image forming method comprising the steps of: providing a protective layer transfer sheet comprising a thermally transferable protective layer having a single or multi-layer structure separably provided on a substrate sheet; providing a print output using a nonsilver photographic color hard copy recording system; putting the protective layer transfer sheet onto the print and thermally transferring the protective layer onto an image in the print so as to cover at least the printed portion; and then separating the substrate sheet from the protective layer transfer sheet, the specular glossiness of the image provided with the protective layer being 65 to 110% as measured in the angle range of 45 to 75 degrees according to JIS Z 8741, the concaves and convexes on the surface of the image can be flattened by the transferred protective layer to impart a high level of glossiness to the image. Further, unlike film laminates, it is possible to eliminate the necessity of significantly increasing the thickness of records, and records can be realized which have image quality comparable to that of silver salt photographs.

What is claimed is:

1. An image forming method comprising the steps of:

providing a print output by a nonsilver photographic color hard copy recording system;

providing a protective layer transfer sheet comprising a thermally transferable protective layer having a single or multi-layer structure separably provided on a substrate sheet formed of a 2 to 100 $\mu$m-thick plastic film having a specular glossiness at 45 degrees of not more than 100%;

putting the print and the protective layer transfer sheet on top of each other and thermally transferring the protective layer onto an image in the print so as to cover at least the printed portion in the print; and separating the substrate sheet from the protective layer transfer sheet.

2. The image forming method according to claim 1, wherein the nonsilver photographic color hard copy recording system is any one of an electrophotographic recording system, an ink jet recording system, and a thermal transfer recording system.

3. The image forming method according to claim 1, wherein the protective layer transfer sheet comprises: a substrate sheet; and, stacked on the substrate sheet in the following order, a thermally transferable release layer having a single or multi-layer structure and a thermally transferable protective layer having a single or multi-layer structure.

4. The image forming method according to claim 1, wherein the protective layer transfer sheet comprises: a substrate sheet; and, stacked on the substrate sheet in the following order, a thermally transferable release layer having a single or multi-layer structure, a thermally transferable protective layer having a single or multi-layer structure, and a thermally transferable adhesive layer having a single or multi-layer structure.

5. An image forming method comprising the steps of:

providing a print output by a nonsilver photographic color hard copy recording system;

providing a protective layer transfer sheet comprising a thermally transferable protective layer having a single or multi-layer structure separably provided on a substrate sheet;

putting the print and the protective layer transfer sheet on top of each other and thermally transferring the protective layer onto an image in the print so as to cover at least the printed portion in the print; and separating the substrate sheet from the protective layer transfer sheet, wherein the coverage of the whole layer to be transferred in the protective layer transfer sheet is 3 to 30 $g/m^2$.

6. An image forming method comprising the steps of:

providing a print output by a nonsilver photographic color hard copy recording system;

providing a protective layer transfer sheet comprising a thermally transferable protective layer having a single or multi-layer structure separably provided on a substrate sheet;

putting the print and the protective layer transfer sheet on top of each other and thermally transferring the protective layer onto an image in the print so as to cover at least the printed portion in the print; and separating the substrate sheet from the protective layer transfer sheet, wherein the material used in the thermally transferable protective layer is a thermoplastic resin having a Tg value of 40 to 100° C. and a storage modulus at 110° C. of not more than $1\times10^5$ Pa.

7. An image forming method comprising the steps of:

providing a protective layer transfer sheet comprising a thermally transferable protective layer having a single or multi-layer structure separably provided on a substrate sheet;

providing a print output by a nonsilver photographic color hard copy recording system;

putting the protective layer transfer sheet onto the print and thermally transferring the protective layer onto an image in the print so as to cover at least the printed portion; and separating the substrate sheet from the protective layer transfer sheet, the thermally transferable protective layer in the protective layer transfer sheet being composed mainly of a thermoplastic resin having a weight average molecular weight ($M_W$) of not more than 20,000 and a number average molecular weight ($M_n$) of not more than 10,000.

8. The image forming method according to claim 7, wherein the thermoplastic resin contains at least one member selected from the group consisting of polyester resins, epoxy resins, and phenoxy resins.

9. The image forming method according to claim 7, wherein the thermoplastic resin has a glass transition temperature of 40 to 80° C.

10. The image forming method according to claim 7, wherein a release layer is further provided between the thermally transferable protective layer and the substrate film.

11. The image forming method according to claim 10, wherein the release layer is composed mainly of an acrylic resin having a number average molecular weight of not more than 40000.

12. The image forming method according to claim 7, wherein the thermally transferable protective layer contains an ultraviolet absorber.

13. An image forming method comprising the steps of:

providing a print output by a nonsilver photographic color hard copy recording system;

providing a protective layer transfer sheet comprising a thermally transferable protective layer having a single or multi-layer structure separably provided on a substrate sheet;

putting the print and the protective layer transfer sheet on top of each other and thermally transferring by means of a thermal head the protective layer onto an image in the print so as to cover at least the printed portion in the print; and separating the substrate sheet from the protective layer transfer sheet.

14. The image forming method according to claim 1, wherein the thermally transferring step is carried out by means of a heat roll.

15. The image forming method according to claim 1, wherein the protective layer transfer sheet is used in a roll form.

16. The image forming method according to claim 1, wherein the protective layer transfer sheet is used in a separated sheet form.

17. The image forming method according to claim 16, wherein an assemblage comprising a mount and a protective layer transfer sheet secured on top of the mount is used.

18. The image forming method according to claim 17, wherein each size of the mount, the protective layer transfer sheet and the print satisfies the following relationship:

Mount≧Protective layer transfer sheet≧Print.

19. An image forming method comprising the steps of:

providing a print output by a nonsilver photographic color hard copy recording system;

providing a protective layer transfer sheet comprising a thermally transferable protective layer having a single or multi-layer structure separably provided on a substrate sheet;

putting the print and the protective layer transfer sheet on top of each other and thermally transferring by means of a thermal head the protective layer onto an image in the print so as to cover at least the printed portion in the print; and separating the substrate sheet from the protective layer transfer sheet, wherein (1) the protective layer transfer sheet is used in a separate sheet form, (2) an assembly comprising a mount and a protective layer transfer sheet secured on top of the mount is used, and (3) a basis weight of the mount is in a range of 80 to 500 $g/m^2$.

* * * * *